Feb. 2, 1971  C. L. GARRISON  3,559,347
GRINDING APPARATUS
Filed Feb. 19, 1969  11 Sheets-Sheet 1

INVENTOR.
CLIFFORD L. GARRISON
BY
Harry O. Ernsberger
ATTORNEY

Feb. 2, 1971　　　　　C. L. GARRISON　　　　　3,559,347
GRINDING APPARATUS

Filed Feb. 19, 1969　　　　　　　　　　　　　11 Sheets-Sheet 2

INVENTOR.
CLIFFORD L. GARRISON
BY
Harry O. Ernsberger
ATTORNEY

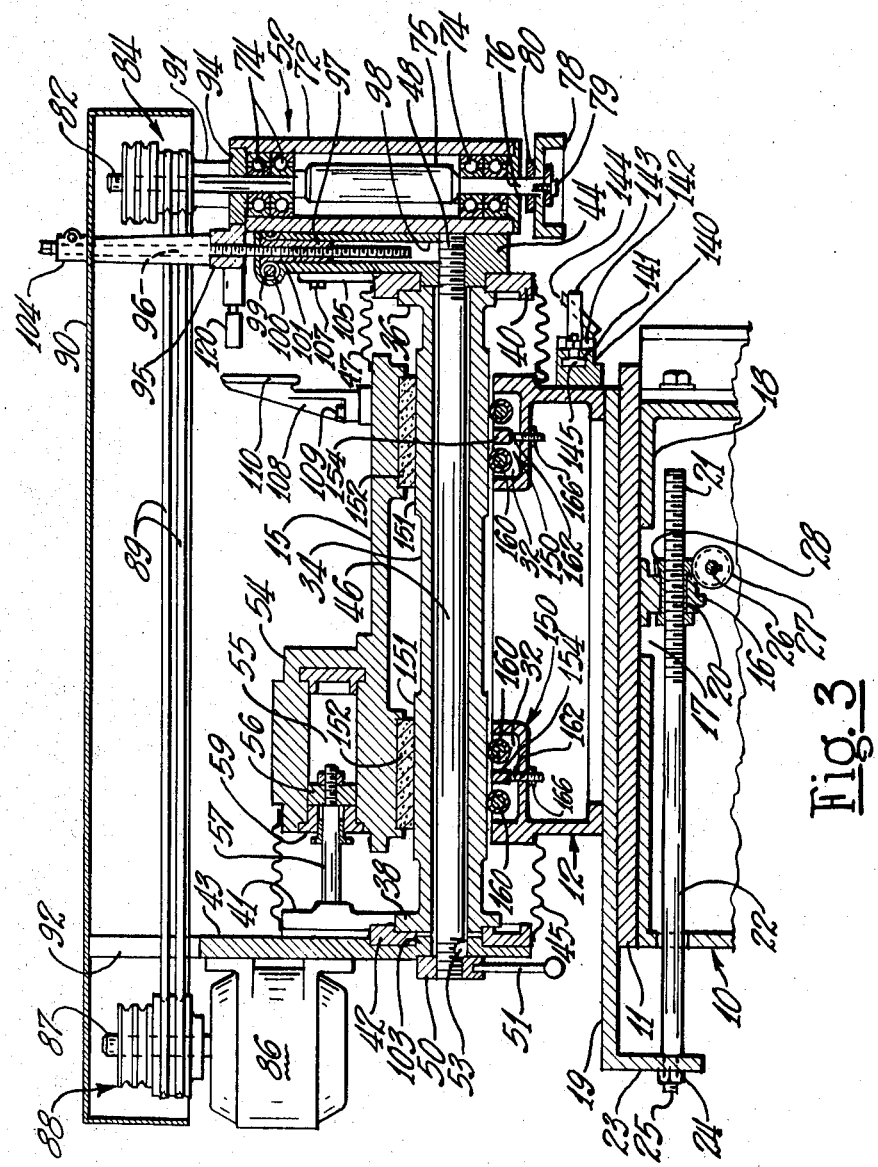

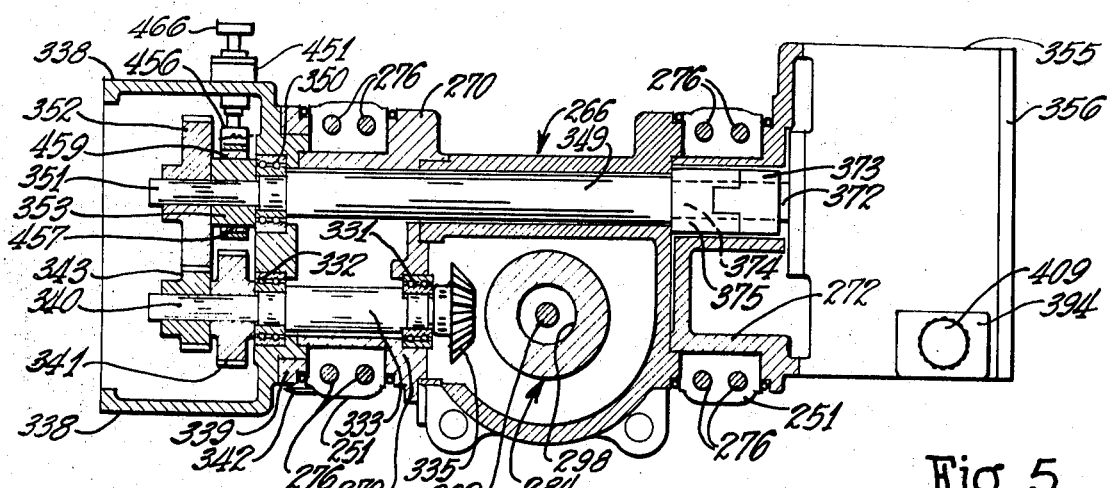

INVENTOR.
CLIFFORD L. GARRISON
BY
Harry O. Ernsberger
ATTORNEY

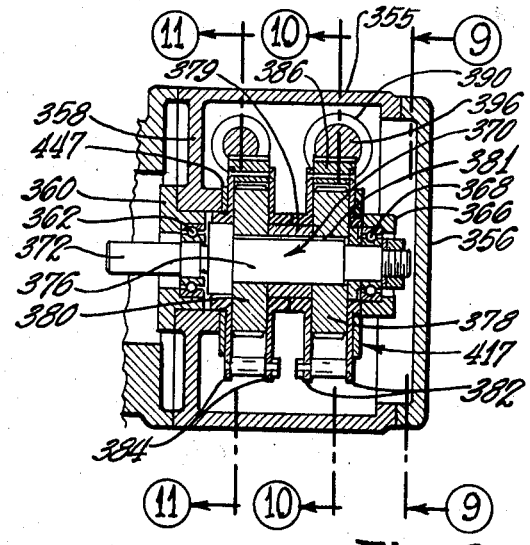
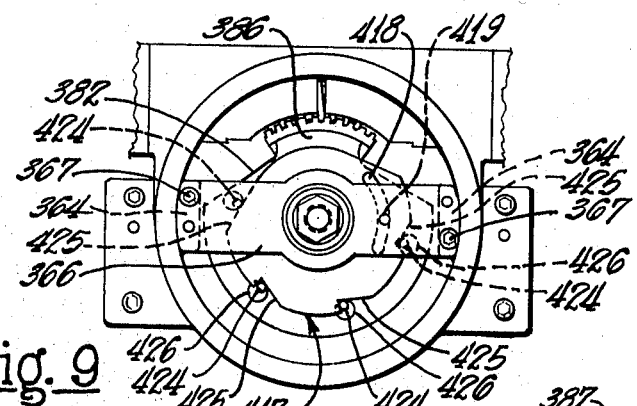
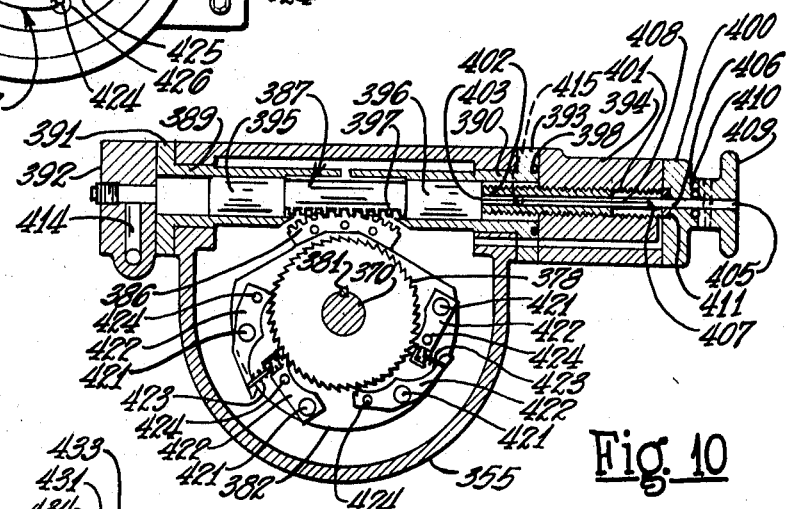
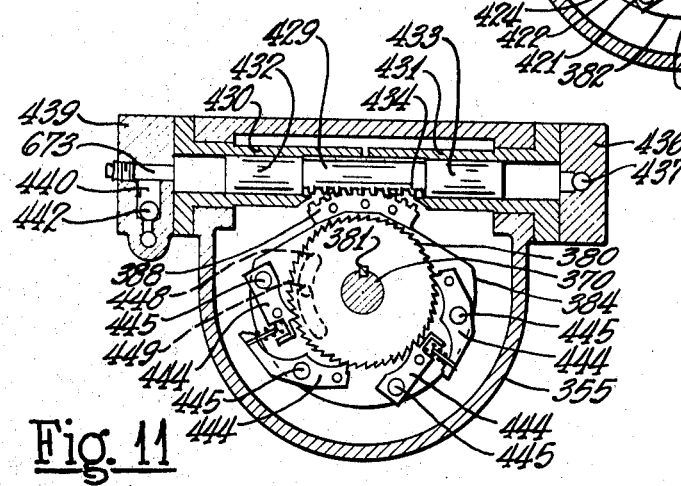

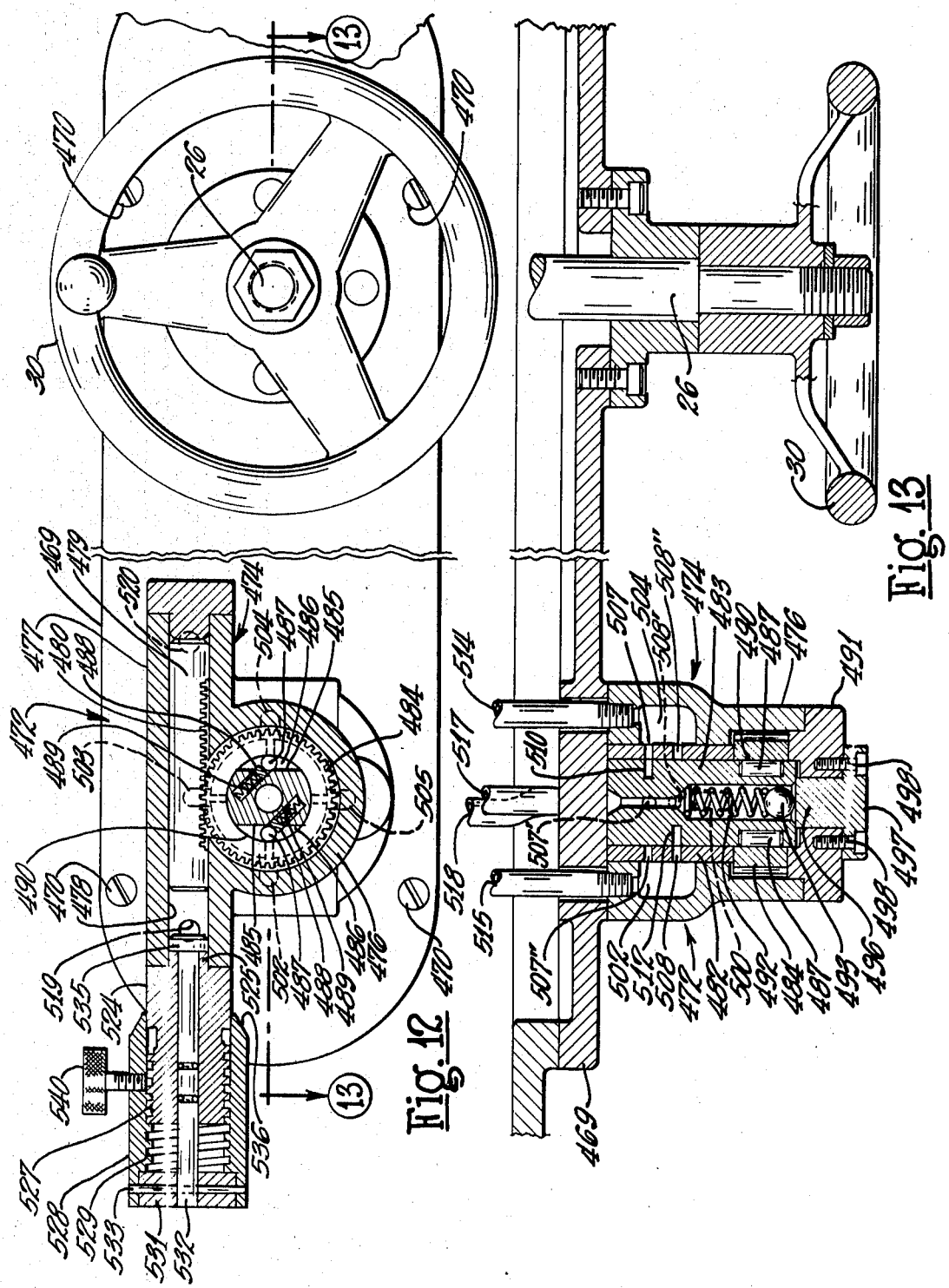

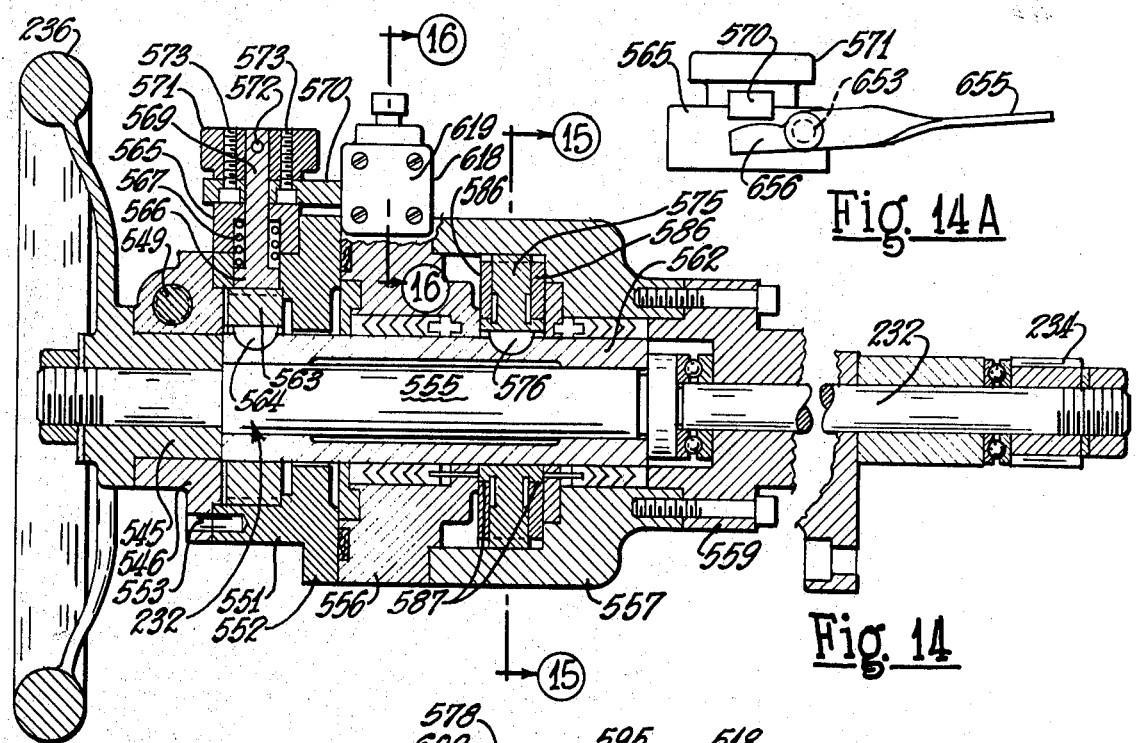

INVENTOR.
CLIFFORD L. GARRISON
BY
Harry O. Ernsberger
ATTORNEY

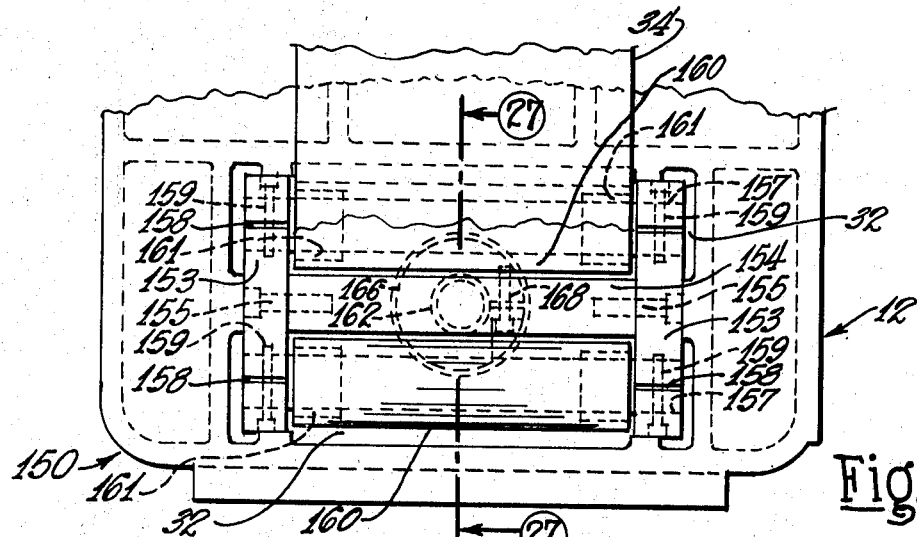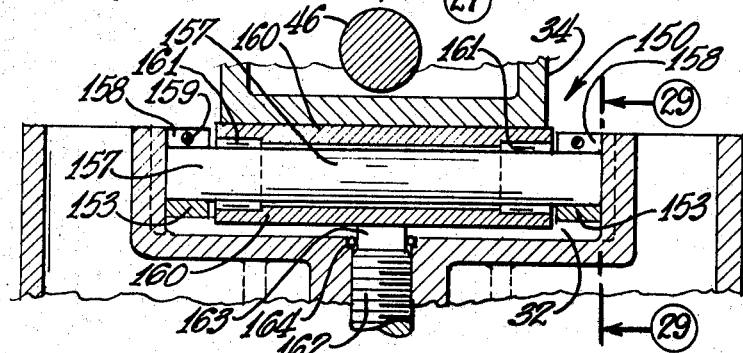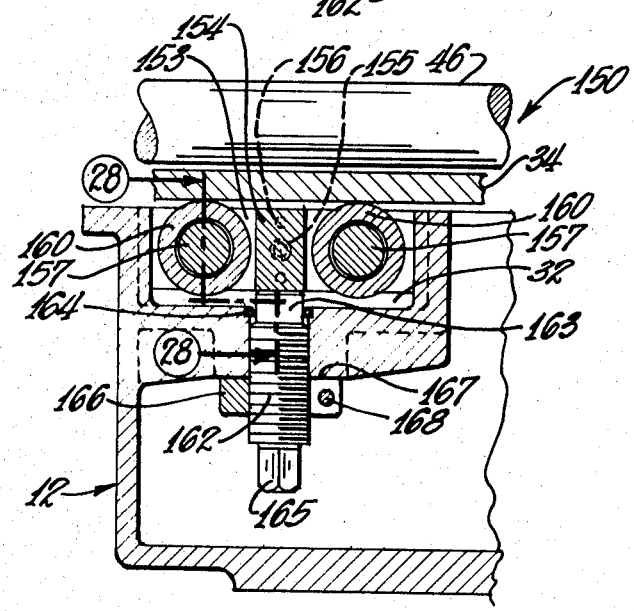

United States Patent Office 3,559,347
Patented Feb. 2, 1971

3,559,347
GRINDING APPARATUS
Clifford L. Garrison, Adrian, Mich., assignor to Oliver Instrument Company, Adrian, Mich., a corporation of Michigan
Filed Feb. 19, 1969, Ser. No. 800,395
Int. Cl. B24b 3/02, 7/00
U.S. Cl. 51—98.5                              14 Claims

ABSTRACT OF THE DISCLOSURE

The disclosure embraces a grinding apparatus or machine especially adapted for grinding the teeth of toothed cutters or workpieces wherein the ram carrying the grinding wheel is reciprocated in a straight line, the grinding apparatus including a universally mounted workpiece or cutter support for grinding teeth of various angularities, the cutter being automatically indexed between successive grinding strokes and the grinding apparatus automatically brought to rest upon completion of grinding operations on a cutter or workpiece.

---

This invention relates to grinding machine or apparatus and more particularly to an apparatus for grinding or removing metal from the teeth of form cutters or rotatable toothed cutting tools where it is imperative that all of the cutting teeth of the cutting tool be shaped or ground to uniform size or standard.

Grinding apparatus has been devised and used for grinding teeth of rotatable cutting tools or multitoothed cutters by reciprocating a ram carrying a rotating grinding wheel to engage the grinding wheel with successive teeth of a cutter, the path of the grinding wheel being controlled during reciprocation of the ram by a guide cam or template associated with the ram. A grinding machine of this character is illustrated in my Pat. 3,081,253.

The present invention embraces a grinding apparatus in which the grinding wheel and its supporting and associated components are reciprocated in a straight line of reciprocation for effecting grinding of teeth of a cutter whereby each tooth of the cutter may be accurately ground or shaped to the same size and configuration.

Another object of the invention involves automatic feed mechanism for the cutter or work supporting means whereby successive teeth of a cutter are ground and the cutter automatically indexed between successive grinding strokes of the grinding wheel.

Another object of the invention resides in a cutter grinding apparatus in which there is complete compensation for wear of the grinding wheel so that all of the teeth of a cutter ground by the wheel are of identical contour and size.

Another object of the invention resides in the provision of a rotatable cutter supporting means which is angularly adjustable to enable the grinding of cutters having cutting teeth of various angularities whereby the grinding apparatus is adaptable for grinding the teeth of various types of tooth cutters.

Another object of the invention resides in a support arrangement for a grinding wheel wherein the grinding wheel is rotatable and reciprocable, the support arrangement being angularly adjustable to adjust the relative angular position of the grinding wheel with respect to the teeth of the cutter to be ground.

Another object of the invention is the provision of grinding apparatus for grinding tooth cutters wherein the reciprocating ram for reciprocating the grinding wheel and the indexing mechanism for the cutter are hydraulically actuated and controlled.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 3 is a longitudinal sectional view taken substantially on the line 3—3 of FIG. 2.

FIG. 4 is a front elevational view of the adjustable support means for a cutter to be ground, certain portions being shown in section;

FIG. 5 is a sectional view taken substantially on the line 5—5 of FIG. 4;

FIG. 6 is an elevational view of the left end of the construction shown in FIG. 4 with the cover removed;

FIG. 8 is a sectional view through the indexing mechanism for a cutter;

FIG. 9 is a view taken substantially on the line 9—9 of FIG. 8;

FIG. 10 is a sectional view taken substantially on the line 10—10 of FIG. 8;

FIG. 11 is a sectional view taken substantially on the line 11—11 of FIG. 8;

FIG. 12 is an elevational view, partly in section, illustrating a counting means for the number of teeth in a cutter for automatically interrupting grinding operations after all of the cutter teeth have been ground;

FIG. 13 is a sectional view taken substantially on the line 13—13 of FIG. 12;

FIG. 14 is a sectional view of the means for adjusting the vertical position of the cutter supporting means, the view being taken substantially on the line 14—14 of FIG. 1;

FIG. 14A is a plan view of certain components of the construction shown in FIG. 14.

FIG. 15 is a sectional view taken substantially on the line 15—15 of FIG. 14;

FIG. 16 is a fragmentary detailed sectional view taken substantially on the line 16—16 of FIG. 14;

FIG. 17 is a front elevational view, with certain parts shown in section, of a fluid pressure control unit for shutting off the operating components at the completion of a cycle of operations;

FIG. 18 is a side elevational view of the construction shown in FIG. 17;

FIG. 26 is a fragmentary plan veiw of a component of the ram supporting means, illustrating a portion of the ram;

FIG. 27 is a fragmentary sectional view taken substantially on the line 27—27 of FIG. 26;

FIG. 28 is a sectional view taken substantially on the line 28—28 of FIG. 27;

FIG. 29 is a fragmentary sectional view taken substantially on the line 29—29 of FIG. 28.

The method and apparatus of the invention are especially usable for grinding or abrading metal of workpieces such as multi-toothed cutters for accurately conforming or sharpening teeth of cutters whereby all of the teeth of a cutter are ground or conformed to a uniform size and shape.

Figure 1:
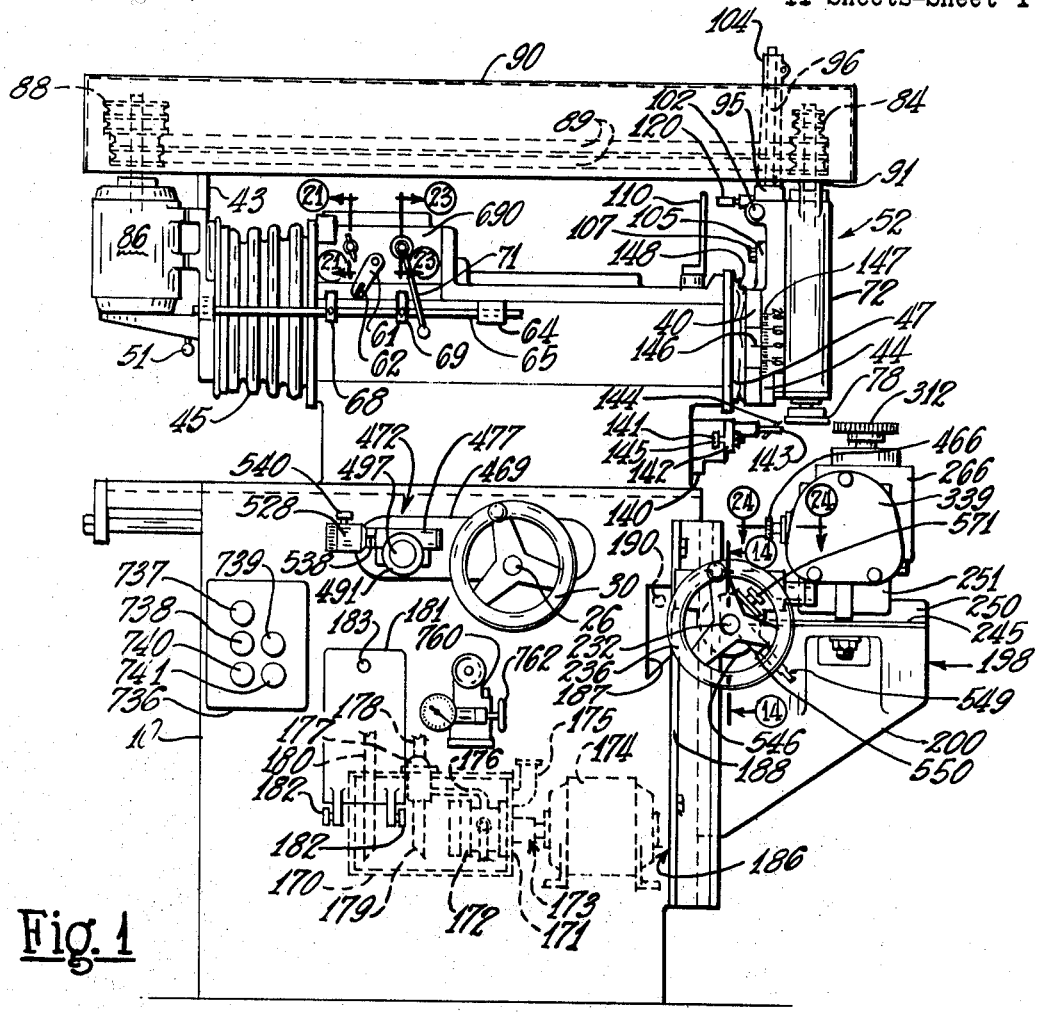
FIG. 1 is a side elevational view of the grinding apparatus of the invention.
Figure 2:
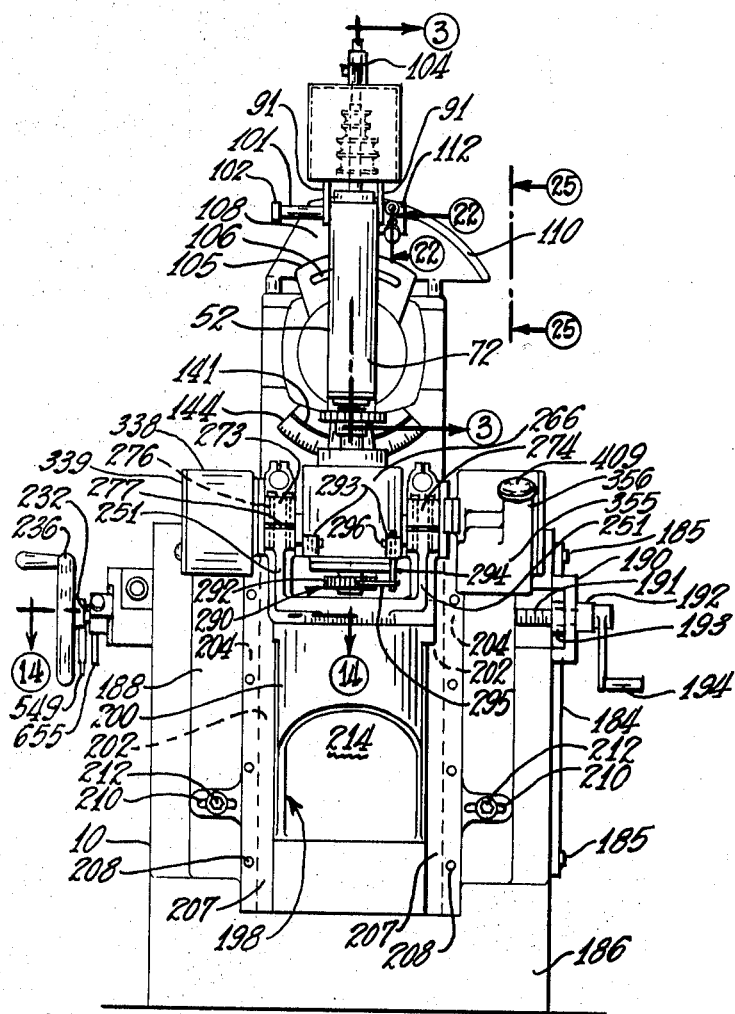
FIG. 2 is a front elevational view of the grinding apparatus shown in FIG. 1.

Referring to the drawings in detail and initially to FIGS. 1, 2 and 3, the grinding apparatus illustrated includes a hollow base, support means or frame 10 formed of cast metal upon which are mounted the components of the grinding apparatus. Mounted upon the housing 10 is a ram supporting carriage 12, the carriage being adjustably supported by the housing or base 10 and guided in longitudinally extending ways provided by a plate 11, the carriage 12 being adjustable longitudinally of the housing 10 as hereinafter described. The carriage 12 includes an upper component 15 reciprocable with the carriage.

As shown in FIG. 3, the plate 11, secured to the base frame 10, is provided with a member 16 extending through an opening 17 provided in a horizontal web portion 18 of the base housing 10, the member 16 being bored to journally support a rotatable nut 20, the nut being internally threaded to receive the threaded portion 21 of a lengthwise arranged rod or shaft 22. One end of the shaft 22 is anchored to a projection 23, integral with a plate 19 secured to the carriage 12, by a nut 24 threaded onto a tenon 25 on the end of the shaft 22.

Journaled transversely in suitable bearings carried by the walls of the base housing 10 is a transversely extending shaft 26 on which is keyed or otherwise secured a worm gear 27, the teeth of which are in mesh with a pinion portion 28 fashioned on the nut 20. The shaft 26 is provided exteriorily of the housing 10 with a hand wheel or manipulating means 30, shown in FIG. 1, for rotating the shaft 26. By rotating the shaft 26, the nut 20 is rotated and the shaft 22, being nonrotatable, effects longitudinal movement of the carriage 12 with respect to the housing 10.

The carriage 12 supports a reciprocable ram construction for reciprocating a rotating grinding wheel relative to a workpiece or cutter to be ground. The carriage 12 is of hollow configuration in which is disposed longitudinally spaced walled chambers 32 containing adjustable bearing units hereinafter described for supporting a reciprocable ram 34. The ram is fashioned at its forward end with a plate-like flange 36 and at the opposite end with a plate-like flange 38. Secured to the forward flange 36 is a plate-like member 40 and secured to the rear flange 38 is a plate-like member 41.

Mounted upon a circular member 42 secured to the flange 38 is a supplemental member 43 which is rotatably adjustable with respect to the member 42 about the axis of the ram 34. Mounted upon member 40 at the forward end of the ram 34 is a member 44 rotatably adjustable about the axis of the ram.

Extending through the tubular central region of the ram 34 is a shaft or rod 46 having a threaded portion 48 threaded into a threaded bore in the member 44 and is locked to the member by a setscrew (not shown). The members 43 and 44 are simultaneously adjustable about the axis of the ram 34 for varying the angular position of a grinding head 52 for grinding different angles on cutter teeth.

The rear end of the shaft 46 is threaded to receive a threaded nut 50 which engages the plate 43 in the manner shown in FIG. 3. The nut is provided with a handle 51 for manipulating the nut. The member 43 is secured to the shaft 46 by a key 53. By releasing or backing off the nut 50, the grinding head 52 carried by the member 44 and the driving means for the grinding head may be rotated about the axis of the shaft 46 to vary the angular position of the head 52 and the grinding wheel. After the angularity of the grinding head has been adjusted, the operator, by manipulating the handle 51, draws up the nut 50 to secure the grinding head and the plate 43 in adjusted position with respect to the ram 34.

The ram is reciprocated by hydraulic means. As shown in FIG. 3, a housing portion 54 of the carriage is fashioned with a bore or cylinder 55 in which is reciprocably mounted a piston 56. A piston rod 57 extends through a stuffing gland carried by a cylinder head 59. One end of the rod 57 is secured to the piston 56, and the other end of the rod secured to the member 41. Oil or other liquid, under pressure, is delivered alternately into the cylinder at opposite sides of the piston to reciprocate the piston.

The valve means (not shown) for alternately directing oil alternately into the cylinder at opposite sides of the piston is of conventional construction and is actuated by an arm 61 having a pad portion 62, shown in FIG. 1. Slidably mounted in a bore in a projection 64 integral with the carriage 12 is a rod 65, the rear end of the rod being anchored or secured to the member 43. Mounted upon the rod 65 are adjustable abutments or blocks 68 and 69 which alternately engage the pad 62 on the lever 61 during reciprocation of the ram, the lever 61 actuating the valve means for delivering oil under pressure alternately into the cylinder 55 at opposite sides of the piston to effect reciprocation of the ram.

The abutments or blocks 68 and 69 may be adjusted to regulate the length of the stroke of reciprocation of the ram 34 and thereby control the length of stroke of the grinding wheel with respect to the cutter being ground. A valve means for controlling flow of pressure fluid into the cylinder 55 is controlled by a lever or arm 71, this mechanism being hereinafter described.

The grinding head 52 includes a sleeve-like or tubular housing 72 mounting antifriction or ball bearings 74 in which is journaled a grinding wheel supporting spindle or shaft 75. The lower end region of the spindle 75 is fashioned with a tenon 76 adapted to support or mount a grinding wheel 78, which, in the embodiment illustrated, is a cup-shaped wheel. The tenon 76 is provided with a threaded bore to receive a securing bolt 79.

Fixedly secured on the tenion portion 76 is a collar 80 so that by drawing up the bolt 79 the grinding wheel is drawn into driving engagement with the collar 80 on the spindle 75.

A tenon portion 82, fashioned on the upper end of the spindle 75, is equipped with a sheave 84 having two belt engaging portions of different diameters to provide for two grinding speeds of the grinding wheel 78. Mounted upon the plate 43 at the rear of the grinding machine is an electrically energizable motor 86 having a shaft 87 on which is mounted a driving sheave 88 having two sheave portions of different diameters reciprocal to the diameters of the sheave portions of the driven sheave 84. Driving belts 89 connect the sheave portions whereby the grinding wheel 78 is rotated by the motor 86.

A sheet metal guard member 90 is supported by projections 91 provided on the sleeve 72 and by an extension 92 provided on the plate 43, the guard 90 embracing the sheaves 84, 88 and the driving belts 89, relative to the ram 34. The spindle housing 72 is mounted in ways (not shown) provided on the member 44 whereby the housing is adapted for movement in a direction normal to the axis of the ram 34.

Mounted on the upper end of the sleeve or housing 72 is a cap 94 and secured to the housing 72 is a member 95. Extending through an unthreaded bore in the member 95 is a threaded shaft 96 which is normally locked against rotation by a clamp means forming a part of member 95.

The shaft 96 extends through a threaded bore in a member or sleeve 97 which is journaled for rotation in a bore 98 provided in the plate-like member 44. Formed on the sleve 97 is a worm wheel portion 99 engaged by a worm 100 formed upon a shaft 101 extending transversely of the grinding machine and rotatably supported in aligned bores in the member 44.

The shaft 101 is equipped with a manipulating knob 102, shown in FIGS. 1 and 2, whereby the worm portion 99 may be rotated to effect relative rotation between the sleeve 97 and the threaded shaft 96, the latter during grinding operations being locked against rotation, to move the grinding head 52 vertically relative to the horizontal axis of the ram 34. The shaft 101 is automatically rotated through small increments to move the grinding head downwardly after each grinding stroke for dressing the grinding wheel.

Means is provided for adjusting the plates 43 and 44 and hence adjusting the drive motor 86 and the grinding head 52 angularly about the axis of the shaft 46 and ram 34. The plate 43 is adjustable about the plate 42 through the provision of a flange 103 extending into a circular opening in the plate 42 as shown in FIG. 3. The plate 40 is equipped with a sector-shaped member 105 fashioned with a slot 106 which accommodates a locking bolt 107, shown in FIGS. 1 and 3, extending into a threaded bore (not shown) in the plate 44.

Thus, when the grinding head 52 and plates 43 and 44 are adjusted angularly with respect to the axis of the ram 34, the bolt 107 may be drawn up and the nut 50 on shaft 46 tightened to secure the grinding head 52 and the motor support plate 43 in angularly adjusted position.

Figure 25:
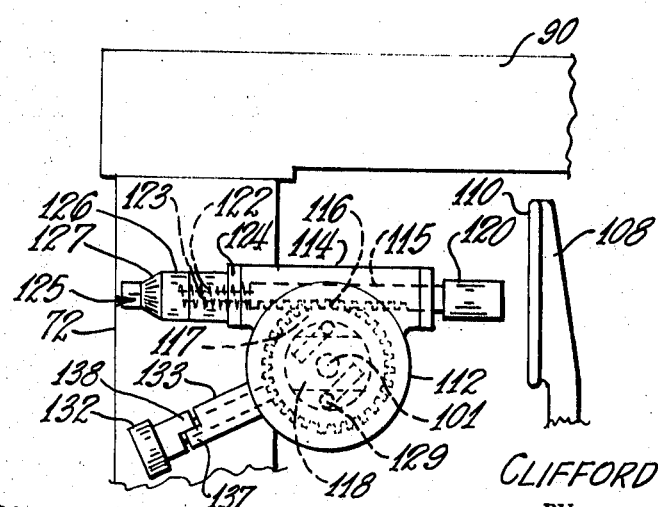
FIG. 25 is an elevational view on the line 25—25 of FIG. 2 illustrating the locking means for the grinding wheel feed and the means for feeding the grinding wheel downwardly after each grinding stroke.

The means for effecting vertical downward movement of the grinding head 52 with each reciprocation of the ram 34 for dressing the grinding wheel is illustrated in FIG. 25. Mounted upon the ram-enclosing housing 15 is a bracket or member 108 secured to the housing by bolts 109.

The bracket 108 is provided with an articulately shaped pad portion 110, the arcuate configuration being generated about the axis of the shaft 46. Mounted upon the housing 72 of the grinding head 52 is a generally cylindrically-shaped housing 112, the housing having a transversely arranged cylindrically-shaped portion 114. The housing 112 and portion 114 enclose mechanism for intermittently rotating the shaft 101 a small amount at each reciprocation of the ram 34. The portion 114 is bored to accommodate a rod or plunger 115 which is provided with rack teeth 116 meshing with the teeth of an annular member 117.

The rod or plunger 115 is reciprocable in the bore in the portion 114. The annular member 117 is rotatably supported upon a hub member 118 secured on the shaft 101. This construction is conventional and is shown and described in Garrison Pat. 3,081,253. The plunger 115 has a portion 120 which is adapted to be engaged by the arcuate pad portion 110 at each reciprocation of the ram so that the rod or plunger 115 is moved lengthwise by engagement of the pad 110 with the portion 120. A coil spring 122 urges the plunger 115 toward the pad portion 110.

A supplemental housing 124 secured to the portion 114 is bored to accommodate the spring 122 and a rod 123 connected with the plunger 115, the rod being provided with a threaded portion (not shown) embraced within a cylindrical member 126, the member 126 having threaded engagement with the rod 123. A beveled portion 127 of the member 126 has graduations cooperating with an index line 125 on the shaft 115. Rotation of the member 126 effects longitudinal movement of the shaft or plunger 115 for the purpose of adjusting the relative position of the plunger 115 to vary the extent of rotative movement of the annular gear 117 with each reciprocation of the plunger 115 effected through engagement of portion 120 with the pad 110.

The member 118 is fashioned with a one-way clutch comprising spring-biased clutch members or rollers 129. Thus, in a left-hand direction of reciprocation of the plunger 115, the plunger is moved a slight distance, the rack teeth 116 moving the annular gear 117 and, through the one-way clutch members 129, the shaft 101 and the worm portion 100, shown in FIG. 3, move the grinding head 52 and grinding wheel 78 downwardly a short distance to effect a dressing of the grinding wheel preparatory to a subsequent grinding stroke of the reciprocating ram. The spring 122 moves the plunger 115 in the opposite direction when the pad 110 moves away from portion 120.

Figure 22:
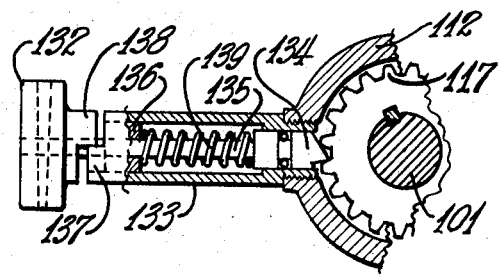
FIG. 22 is a detailed sectional view taken substantially on the line 22—22 of FIG. 2 illustrating a locking means for interrupting downward feed of the grinding wheel.

Means is associated with the mechanism in the housing 112 for locking the annular gear 117 against movement to prevent down feed of the grinding wheel, this arrangement being shown in FIG. 22. As shown in FIGS. 22 and 25, a tubular sleeve or member 133 is secured to the housing 112, the sleeve 133 accommodating a locking detent 134, the detent having a rod 135 extending through a plug 136 in the end of the housing 133.

A manipulating knob 132 is secured to the rod 135. The plug 136 has a semicircular ledge portion 137 and the manipulating knob 132 has a semicircular ledge portion 138. The locking detent 134 is biased toward a position engaging the teeth of the annular gear 117 under the influence of the coil spring 139. In normal grinding operations the ledge portions 137 and 138 are in endwise engagement holding the locking detent 134 out of engagement with the annular gear. When it is desired to lock the gear 117 to prevent downward feed of the grinding wheel, the knob 135 is rotated until the ledge portions 137 and 138 are in side-by-side relation, as shown in FIG. 22, whereby the spring 139 engages the detent 134 with the gear teeth.

Means is provided for adjusting a grinding wheel dressing tool or diamond 144 angularly with respect to the axis of the ram 34. Secured to the housing 12 is an arcuately-shaped member 140 having an arcuately-shaped slot 141 of T-shaped cross section. Slidably mounted on the arcuately-shaped member 140 and guided by the slot 141 is a member 142 providing a support for a projection 143 carrying the wheel dressing diamond or tool 144.

The member 142 is movable in the slot 141 so as to adjust the relative position of the wheel dressing diamond 144 when the angular position of the grinding head 52 is adjusted so that the grinding wheel surface may be properly engaged by the dressing diamond. Bolts 145, one of which is shown in FIG. 3, may be drawn up to secure the member 142 in adjusted position.

Indicating means is provided for facilitating the angular adjustment of the grinding head 52 about the longitudinal axis of the ram 34. As shown in FIG. 1, the plate 40 is fashioned with an index line 146 and an arcuate surface of the member 44 is fashioned with degree graduations 147. The grinding head 52 is angularly adjustable about the axis of the ram 34 and the degree of angularity may be determined by the graduation in registration with the index line 146.

The grinding head 52 is locked in adjusted position by drawing up the nut 50 on the end of shaft 46 extending through the ram 34 and by drawing up the clamping bolt 107 extending through an arcuate slot 106 in an extension 105 of the plate 40 and being threaded into an opening in the member 44 of the grinding head.

FIGS. 3 and 26 through 29 illustrate means for supporting the ram 34, which means is adjustable to eliminate any transverse lost motion so that the ram 34 will be reciprocated in a linear path whereby to provide for extreme accuracy in grinding a workpiece or cutter.

The ram support means includes dual bearing units 150 arranged in spaced relation lengthwise of the ram as shown in FIG. 3. Each of the bearing units or assemblies 150 is adjustable vertically. Upper flat surfaces 151 on the ram 34 slidably engage stationary abutment or guide blocks 152 supported upon an upper frame structure 15 of the carriage 12.

FIGS. 26 through 28 illustrate one of the bearing units or assemblies 150 supporting the ram 34. Each of the chambers 32 is of generally rectangular shape. Disposed in each of the chambers is a bearing carriage assembly including bars or members 153 disposed in parallel relation and parallel with the ram 34. The bars 153 are secured to the ends of a transversely extending member 154 by means of screws 155 and dowels 156, shown in FIG. 29.

The bars 153 are bored to receive shafts 157, the bars having slots 158 so that portions of the bars embracing the ends of the shafts 157 are drawn into snug engagement with the bars by screws 159, shown in broken lines in FIGS. 26 and 29. Ram support rolls 160 are journaled on sets of needle bearings 161 contained in interior recesses in the rolls, the needle bearings engaging the periphery of the shafts 157, this arrangement providing an antifriction roller support for the ram.

Each of the assemblies of bars 153 and 154 carrying the ram supporting rolls 160 is vertically adjustable so as to eliminate any lost motion of the ram in a vertical direction, the adjusting means for a bearing assembly being particularly shown in FIG. 27.

The portion of the frame structure beneath the chamber 32 is threaded to accommodate a threaded abutment member or screw 162 having a tenon portion 163, the upper surface of which engages the lower surface of the transversely extending bar 154.

A lubricant sealing ring 164 surrounds the tenon portion 163. The lower end of the screw is fashioned with a polygonally-shaped portion 165 to accommodate a wrench or other suitable tool for adjusting the screw 162. The adjusting screw 162 is secured in adjusted position by a C-shaped clamp 166 which is adapted to be drawn into engagement with the screw 162 and snugly engaging the flat surface 167 of the housing member 12 by a clamping screw 168, shown in FIGS. 26 and 27.

Through this arrangement, each of the abutment screws 162 may be adjusted upwardly to exert a proper pressure of the rolls 160 against the ram to support the ram. Lost motion of the ram in a vertical direction is thus eliminated so that the ram and the grinding wheel carried by the grinding head move in an accurate rectilinear path to insure uniform grinding of the teeth of a cutter or workpiece. By supporting the ram and its associated components upon needle bearing-supported rollers 160, there is a minimum of wear of the engaging surfaces. In event of wear of the surfaces the abutment screws 162 may be quickly and easily readjusted.

The ram 34 and grinding head 52 and other components of the arrangement are actuated by hydraulic pressure, preferably oil under pressure. Disposed within the housing 10, as shown in broken lines in FIG. 1, is a reservoir or tank 170 which contains a supply of oil or other fluid.

Secured to a wall 171 of the tank is a hydraulic pump 172 of the conventional rotary vane type for developing hydraulic pressure. A coupling 173 connects the pump shaft with the drive shaft of a motor 174 supported by means (not shown). A filler tube 175 is provided for the tank 170.

The outlet pipe 176 from the pump is connected with an accumulator and relief valve 177, a tube 178 conveying the oil under pressure to the several fluid operated components. The relief valve 177 is provided with a relief vent tube 179. The fluid return circuits or tubes of the hydraulic system are connected with a pipe 180 whereby oil is returned from the various components to the tank 170.

The base housing 10 is of hollow configuration, and as shown in FIG. 1, is equipped with an access door 181 pivotally supported upon projections or lugs 182 integrally cast on the front wall of the housing 10. A rotatable knob 183 operates a latch means (not shown) to release the door 181 for pivotal movement about the pivot axis. The opposite side of the base housing or frame 10 is open and is normally closed by a closure plate 184, shown in FIG. 2, secured to the frame or base 10 by screws 185.

The grinding apparatus is inclusive of a workpiece or cutter supporting arrangement wherein the components are adjustable to dispose the workpiece or cutter in various positions so as to effect grinding of portions or teeth of the workpiece or cutter of various angles through the straight line reciprocation of the grinding head 52 and the grinding wheel carried thereby. Particular reference is directed to FIGS. 1, 2 and 4 through 7.

Figure 7:
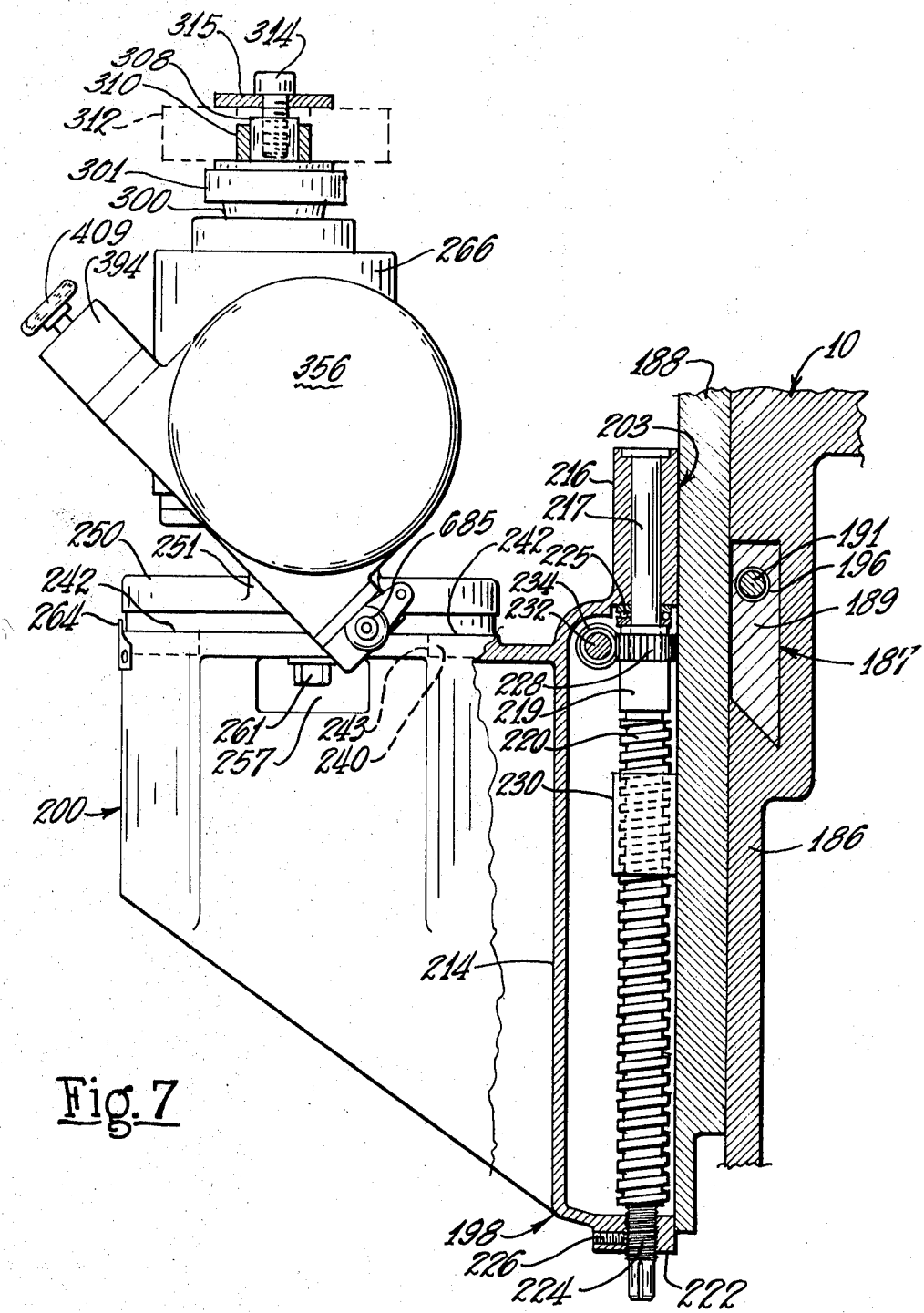
FIG. 7 is an elevational view, partly in section, of the right side, as viewed in FIG. 2, of the cutter supporting arrangement.

The base frame 10 is fashioned with a front wall portion 186 fashioned with a transversely extending slot 187 and disposed contiguous with portion 186 is a mounting plate 188 as shown in FIG. 7. Secured to the mounting plate 188 is a transversely extending bar or member 189 of the same configuration as the slot 187 and is arranged for slidable movement in the slot. As shown in FIG. 2, there is secured to the side wall of the base 10 a bracket 190 bored to receive a smooth surfaced portion of a threaded shaft 191.

Collars 192 and 193 disposed on the shaft at the respective sides of the bracket 190 are secured to the shaft so that the shaft is rotatable but restrained against lengthwise movement by the collars 192 and 193. A crank 194 is fitted onto a projecting portion of the shaft 191 for manually rotating the shaft. Fixedly mounted in a bore in the bar 189 is an interiorly threaded bushing 196, shown in FIG. 7, fixedly secured in the bore in the bar 189. The threaded portion of the shaft 191 is threaded through the bushing 196. By rotating the shaft 191 through manipulation of the crank 194, the work support mounting plate 188 and associated components are adjustable transversely of the base frame 10.

The work supporting arrangement includes a member 198 having a generally semicircularly-shaped pedestal portion 200 and laterally-extending, vertically-arranged plate-like members 202.

The member 198 has a surface 203 which is contiguous with the frontal surface of the mounting plate 188, the member 198 being vertically adjustable relative to the mounting plate 188 by means hereinafter described. The vertically extending members 202 of member 198 are arranged for slidable movement between ways 204 integrally formed with member 188.

Vertically extending plates 207 are secured to the vertically extending ways 204 by screws 208 threaded into openings in the ways 204 integrally formed with the mounting plate 188 whereby the member 198 is vertically slidable in the ways. The mounting plate 188 is fashioned with pairs of slots 210 accommodating bolts 212 threaded into openings in the base frame portion 186 for locking the member 188, member 198 and components carried thereby in a transversely adjusted position.

The pedestal member 198 is mounted for vertical adjustment relative to the ways 204 to elevate or lower a workpiece or cutter with respect to the grinding wheel. Referring to FIG. 7, the member 198 is fashioned with a wall or web 214 providing a chamber accommodating the means for vertically adjusting the member 198. The upper portion of member 198 is fashioned with a boss 216 bored to accommodate a tenon portion 217 on a vertical shaft 219. The shaft 219 is fashioned with a threaded portion 220, and an antifriction or ball bearing construction 225 is disposed between the boss portion 216 and the shaft 219.

The member 198 has a boss portion 222 beneath the threaded portion 220 of the shaft which has a threaded opening accommodating an abutment member or screw 224. The abutment screw 224 engages the lower end of the threaded portion of the shaft 219 and may be adjusted to eliminate lost motion of the shaft 219 with respect to the member 198. The abutment screw 224 may be locked in adjusted position by a setscrew 226.

The shaft 219 is fashioned with a pinion or pinion portion 228. Secured to the mounting plate 188 is a block or member 230 which is interiorly threaded and accommodates the threaded portion 220 of the shaft 219. Journaled in bearings carried by the member 198 is a transversely extending shaft 232 provided or fashioned with a worm 234 which meshes with the teeth of the pinion or worm wheel 228 mounted on the shaft 219. The shaft 232 projects exteriorly of the member 198 and is equipped with a hand wheel 236, shown in FIGS. 1 and 2.

By rotating the hand wheel 236 and hence the shaft 232 and worm 234, the shaft 219 is rotated through enmeshment of the teeth of the pinion 228 of the shaft with the worm 234. The shaft 219, having threaded engagement with the block 230, is elevated or lowered dependent upon the direction of rotation of the hand wheel 236 thus elevating or lowering the member 198. The vertical movement of member 198 is guided by the ways or members 204.

The pedestal portion 200 of the member 198 provides the mounting means for the workpiece or cutter supporting apparatus, the apparatus including means for adjusting a workpiece or cutter to any degree of angularity and for indexing the workpiece or cutter automatically by hydraulically actuated mechanisms. As shown in FIG. 4, the upper portion of the pedestal 200 is fashioned with an inwardly extending circular flange having an accurately ground upper planar or flat surface 242, the inner circular wall 243 of the flange being accurately ground to provide a smooth cylindrical surface.

Supported upon the planar surface 242 is a member 249 and a circular plate 245, the plate having a depending circular flange or cylindrical portion 247, the outer cylindrical surface of the depending flange 247 being accurately ground and of a diameter to snugly, yet rotatably, fit within the cylindrical surface 243 of the flange whereby the plate 245 and member 249 may be rotated with respect to the pedestal portion 200. The member 249 includes a circular plate-like portion 250 and upwardly extending legs or leg portions 251 integrally cast as a unit construction. As shown in FIG. 4, the plate 245 is secured to the member 249 by circumferentially arranged screws 252.

As shown in FIG. 4, the member 249 is fashioned with a circular recess 254 and the upper peripheral portion of member 245 is fashioned with a circular recess 256, the recess regions 254 and 256 together providing a circular slot configuration. An inner cylindrical surface 255 of member 249 and the outer peripheral surface 253 of the portion 245 are spaced to provide a circular slot which accommodates securing bolts 259, the heads of the bolts being disposed in the circular slot provided by the recesses 254 and 256, the bolts extending through openings in ledge portions 258 provided by diametrically disposed recessed regions 257 in the upper portion of the pedestal 200. The bolts 259 accommodate nuts 261. When the nuts 261 are released the member 249 may be rotated about its axis to any position and the nuts 261 drawn up to secure the member 249 in adjusted position. The peripheral surface of the lower portion of member 249 is provided with graduations 262 in degress, preferably embracing sixty degrees, and the pedestal 200 provided with an index means or finger 264 for indicating the angular adjustment of member 249. The member 249 provides support for trunnions associated with a member 266. The upwardly extending arms 251 are fashioned with semicircular bearing surfaces 267 and 268 which form trunnion bearings for trunnions 270 and 272 associated with the member 266.

The trunnions 270 and 272 are maintained in the bearing surfaces 267 and 268 by bearing caps 273 and 274 which are secured to the legs 251 by bolts 276, shown in FIG. 5. The surfaces of the bearing caps 273 and 274 adjacent the upper surfaces of the legs 251 are slightly spaced so that when the bolts 276 are drawn up, the trunnions are securely held in adjusted position.

The member 266 is formed at its lower end with a circular recess 279 in which is mounted an antifriction bearing 280 preferably of the tapered roller type, as shown in FIG. 4. The upper end region of member or housing 266 is fashioned with an annular recess 281 in which is mounted a second antifriction bearing 282 preferably of the tapered roller type.

Extending through the hollow interior of the member 266 is a work supporting arbor, spindle or shaft 284 journally supported in the tapered roller bearings 280 and 282. The lower end of spindle 284 is fashioned with a cylindrically-shaped tenon portion 285 on which is mounted an annular member 286 pressed or otherwise secured on the tenon. An annular member 287 is secured to the lower end of the member 266 and is concentric with the vertical axis of member 286. An oil seal ring 288 is disposed between the annular members 286 and 287.

Mounted upon a tapered portion of the tenon 285 is a circular workpiece indexing plate 290 having peripheral teeth or projections 292 provided by spaced peripheral recesses shown in FIG. 2. With reference to FIG. 2, the member 266 is fashioned with two hollow bosses 293. Extending into one of the bosses is a pin or stub shaft 294 upon which is mounted a spring plate indexing finger 295, the pin 294 being secured in a hollow boss by setscrew 296. The indexing finger or member 295 engages teeth 292 in the plate 290 for use in indexing a toothed cutter of small diameter when mounted upon the spindle or arbor 284. The indexing plate 290 is secured on the spindle 284 by a nut 291.

The other of the pair of bosses 293, shown in FIG. 2, is to support the pin 294 and the indexing plate 295 in a reverse position for engagement with the indexing member 290 when the teeth of a left-hand cutter are to be ground. The indexing arrangement comprising the indexing plate 290 and the spring indexing finger 295 is employed only for indexing a cutter of comparatively small diameter.

The spindle or arbor 284 is tubular, being fashioned with a bore 298 which joins with a frusto-conically shaped interior surface 299. The frusto-conically shaped interior surface 299 accommodates a tapered workpiece mounting member or support 300 having a platform or work supporting portion 301. The lower region of the member 300 has a threaded opening to receive the threaded portion of a bolt 302, the bolt extending through an opening in a collar 304, the latter being engaged by the head 305 of the bolt.

The member 300 may be drawn into snug wedging engagement with the frusto-conically shaped surface 299 by manipulating the bolt 302. This arrangement also provides for interchangeability with other sizes of work support members. The work support member 300 is fashioned with a tenon 308 which is adapted to accommodate an adapter 310 of a size to be received in the opening of a cutter or workpiece 312 shown in FIG. 4.

The upper region of member 300 is fashioned with a threaded bore to accommodate a bolt 314 for securing a workpiece or cutter 312 to the mounting member 300, a washer 315 being disposed between the head of the bolt and the upper surface of the workpiece or cutter 312. This arrangement facilitates quickly mounting a cutter on the work supporting member 300, a collar or adapter 310 being selected to accommodate the central bore of the cutter 312.

FIG. 4 illustrates components of an indexing arrangement for indexing a comparatively large diameter cutter to bring successive teeth of the cutter into a position to be engaged by the grinding wheel 78. Each of the bearing caps 273 and 274 is fashioned with a cylindrical bore 318. Snugly received in the bearing cap 274 is a stub shaft 320 which may be adjusted in the bore and held in adjusted position by drawing up a securing bolt 322. The stub shaft 320 has a transverse bore snugly accommodating a rod or stub shaft 324.

The stub shaft 324 accommodates a clamp 325 carrying an index finger 327 for engagement with teeth of the cutter 312. The flexible indexing finger 327 is adapted for engagement with successive teeth for positioning the cutter during a grinding stroke of the grinding wheel with a tooth of the cutter. The flexibility of the finger 327 facilitates indexing movements of the cutter 312 without readjustment of the indexing finger 327.

In the arrangement shown in FIG. 4, the indexing finger and support means are arranged for indexing teeth of a right-hand cutter. When it is desired to grind the teeth of a left-hand cutter, the shaft 320 is inserted in the bore 318 in the bearing cap 273, and the shaft 324, finger support means 325 and the finger 327 are adjusted whereby the finger is adjusted for engagement with the teeth of a left-handed cutter.

The trunnions 270 and 272 are rotatable in their bearings in order to vary the angular position of the cutter supporting spindle 284 and a cutter carried thereby where angular teeth on a cutter are to be ground. In order to make an angular adjustment of the spindle 284, the bolts 276, securing the bearing caps 273 and 274 in clamping engagement with the trunnions, are loosened and the trunnions rotated to adjust the angular position of the spindle 284. The bolts 276 are then drawn up to secure the spindle in adjusted position.

Means is provided for indicating the extent of angularity of adjustment of the spindle 284 with respect to a vertical axis. Secured to the housing 338 is an annular member 339, the periphery of which is provided with a series of graduations in degrees (not shown) which cooperate with an index finger or index member 342 (shown in FIG. 5) secured to the trunnion supporting member 249.

The workpiece or cutter indexing arrangement includes means for rotating the spindle 284 after a grinding stroke on a cutter tooth has been made to index or rotate the cutter to a position for performing a grinding stroke upon the next succeeding tooth of the cutter. Fixedly mounted on the work supporting spindle 284 is a gear 329 secured on a spindle by keys 330. Journally supported in antifriction bearings 331 and 332 mounted respectively in a wall of the trunnion 270 and a wall of a housing 338 is a rotatable shaft 333 having a tenon portion 334 on which is fixedly mounted a drive pinion 335.

The teeth of the drive pinion are enmeshed with the teeth 336 of the driven gear 329 mounted on the spindle 284. The housing 338 is secured to the trunnion 270 and is provided with a removable cover 337. The shaft 333 has a tenon portion 340 upon which gears 341 and 343 are mounted. Journaled in antifriction bearings 344 is a shaft 345, a tenon portion 346 thereof extending into the housing 338 being equipped with an idler gear 347. As shown in FIG. 6, the gear 347 is in mesh with the gear 341.

The arrangement includes an indexing shaft 349, shown in FIG. 5, journaled at one end in antifriction bearings 350 disposed in a wall of the housing 338 and in a bore in the trunnion-suported member 266.

The shaft 349 is fashioned with a tenon 351 extending into the housing 338. Keyed or otherwise mounted on the tenon 351 is a gear 352 in mesh with the gear 343. A spacing collar 353 is secured on the tenon 351 and is disposed between the gear 352 and the antifriction bearing 350.

The indexing shaft 349 is actuated by indexing mechanism contained in a housing 355 fixedly secured to the trunnion member 272, the housing 355 being provided with a removable cover plate 356. The indexing mechanism is particularly shown in FIGS. 8 through 11. Extending across the housing 355 is a wall 358 having an opening in which is disposed a flanged collar 360, the latter supporting antifriction or ball bearings 362. The interior of the housing is fashioned with diametrically arranged bosses 364, shown in FIG. 9, which support a frame member or bracket 366 secured to the bosses by screws 367.

Mounted in an opening at the central region of the bracket 366 is an antifriction bearing 368, shown in FIG. 8. Journally mounted in the bearings 362 and 368 is a shaft 370. A tenon portion 372 is equipped with a coupling member 373, shown in FIGS. 4 and 5. A tenon portion 374 of the indexing shaft 349 is equipped with a coupling member 375 which interlocks with the coupling member 373 in a conventional manner to establish an operative drive from the shaft 370 with the index shaft 349.

With particular reference to FIG. 8, the shaft 370 has an intermediate portion 376 on which is mounted an indexing ratchet wheel or member 378 and an index return ratchet wheel or member 380, both members being secured on the shaft by a key 381. The ratchet wheels 378 and 380 are spaced by a collar 379. Disposed at each side of the ratchet wheel 378 are disc-like members or plates 382. Disposed at each side of the index return ratchet wheel 380 are plates 384. Disposed between and secured to the plates 382 is an arcuately-shaped toothed sector 386. Disposed between the plates 384 is an arcuately-shaped tooth sector 388, the toothed sectors being respectively secured to the sets of plates by means of rivets.

Referring to FIG. 10, the housing 355 is fashioned with boss portions bored to accommodate sleeve-like members 389 and 390 which are pressed into the openings in the bosses in the housing 355. Secured to a flange 391 of the sleeve 389 is a fitting 392. Secured to a flange 393 on the sleeve 390 is a fitting 394. The interior bores of the sleeves 389 and 390 provide chambers or cylinders accommodating a reciprocable plunger 387 having cylindrically-shaped heads 395 and 396 which are integrally connected together by a toothed rack section 397, the teeth of which are in mesh with the teeth of the arcuate sector 386. The heads 395 and 396 function as pistons in the cylinders provided by the sleeves 389 and 390.

The pistons 395 and 396 and the intermediate toothed rack section 397 are reciprocated by hydraulic means. Disposed between the flange 393 of member 390 and the fitting 394 is a oil seal or sealing ring 398. Secured to the fitting 394 is a cap member or fitting 400. The interior of the fitting 394 is provided with a threaded bore 401 in which is disposed a threaded member or adjustable abutment 402. The threaded member or abutment 402 is provided with a longitudinal central passage 403 which is of square or polygonally shaped cross section.

A rod 405 is of circular cross section at the portion 406 up to the region indicated at 407, the remainder 408 of the rod being of square cross section and being slidably received in the passage 403 of square cross section in the threaded member 402. Secured to the end region of the rod 405 is a manipulating knob 409, an oil seal or sealing ring 410 being disposed between the knob 409 and the cap 400. Press fitted onto the rod 405 and accommodated in a circular recess in the fitting 400 is a collar 411. As the knob 409 and the collar 411 abut the fitting 400, there is no lengthwise movement of the rod 405 when the same is rotated by manipulating the knob 409.

Through the threaded engagement of member 402 with the threaded bore 401, rotation of the knob 409 and the rod 405 effects lengthwise relative movement of the threaded member or abutment 402, the direction of movement being dependent upon the direction of rotation of the knob 409.

Thus, the member 402 may be adjusted relative to the end of the plunger head 396 so that the relative position of the member 402 determines the extent of movement of the toothed rack 397 and hence the extent of indexing movement transmitted to the cutter or workpiece 312 for indexing the cutter.

The fitting 392 is fashioned with passage means 414 and member 390 provided with a passage 415 for conveying oil or other fluid to the ends of the cylinders containing the plunger heads 395 and 396 for actuating the indexing mechanism. Loosely journaled on a hub portion of one of the members 382 is a plate or member 417, shown in FIGS. 8 and 9. The plate 417 is fashioned with an arcuately-shaped slot 418 and a pin 419 carried by the bracket 366 extends into the slot 418, as shown in FIG. 9, the pin and slot arrangement providing for restricted rotational movement of the plate 417 with respect to the plate 382.

FIG. 10 illustrates the pawl mechanism for cooperation with the teeth of the ratchet wheel 378 for indexing the cutter to bring a succeeding tooth of the cutter in a position to be ground. Mounted on the plate 382 are pins 421 upon which the pawl members 422 are mounted for pivotal movement. The teeth of the pawls are biased toward the ratchet wheel 378 by expansive coil springs 423. Each of the pawls 422 is provided with a pin 424 which cooperates with cam surfaces 425 formed on the periphery of the floating plate 417. The plate 382, adjacent the plate 417, is fashioned with clearance openings 426 to accommodate movement of the pins 424 outwardly of the axis of the shaft 370.

During an indexing movement of the rack section 397 in a right hand direction, as viewed in FIG. 10, the pawls 422 are in engagement with the teeth of the ratchet wheel 378 and effect movement of the ratchet wheel and the indexing shaft 370 in a clockwise direction until such movement is arrested by engagement of the end of the piston head 396 with the end of the abutment member 402, shown in FIG. 10.

Fluid pressure is then transferred to act upon the piston head 396 to move the toothed rack 397 in a lefthand direction and move the pawl supporting plate 382 in a counterclockwise direction. The floating plate 417 is rotated with the pawl supporting plate 382 by reason of the engagement of the pins 424 in the notches in the periphery of the plate 417 as shown in FIG. 9.

The floating plate 417 is moved in a counterclockwise direction until the end of the slot 418 engages the pin 419 thereby preventing further rotational movement in a counterclockwise direction of the floating plate 417. Continued fluid pressure acting against the piston head 396 effects further counterclockwise rotation of the pawl plate 382 whereby the pawl pins 424 are caused to slide along the cam surfaces 425, shown in FIG. 9. Withdrawing the pawls 422 from engagement with the ratchet wheel 378.

In the performance of an indexing movement of the cutter to bring a succeeding cutter tooth into position to be ground, the cutter must be rotated a sufficient distance until the flexible finger 327, shown in FIG. 4, moves beyond the succeeding tooth. As various cutters have different numbers of teeth and teeth of different spacing, adjustment of the extent of movement of the toothed rack 397 is imperative in order to secure proper indexing of teeth of various type cutters. The extent of indexing movement of the ratchet wheel 378 is determined by the relative position of the abutment 402.

The operator rotates the knob 409 and shaft 405 to effect longitudinal movement of the abutment 402 to a position which, when engaged by the piston head 396, has effected movement of the ratchet wheel 378 and the cutter 312 until the succeeding cutter tooth moves beyond the flexible indexing finger 327. The arrangement shown in FIGS. 8 and 11 performs the function of reversing the rotation of the cutter to bring the tooth to be ground into abutting engagement with the flexible indexing finger 327. The teeth of the ratchet wheel 380, shown in FIG. 11, project in a direction opposite to the teeth in the ratchet wheel 378.

The arrangement for actuating the ratchet wheel 380 is illustrated in FIG. 11 and is inclusive of sleeve-like members 430 and 431, similar in construction to the members 389 and 390 hereinbefore described.

The interior bores of the sleeve-like members 430 and 431 respectively accommodate a plunger 429 having heads or pistons 432 and 433, the plunger having a toothed rack section 434.

A fitting 436 is secured to a flange portion of the sleeve 431 and is fashioned with passage means 437 accommodating flow of fluid into and out of the chamber adjacent the piston head 433. A second fitting 439 is secured to the flange portion of the sleeve or member 430 and is fashioned with passage means 440 accommodating flow of fluid into or away from the chamber adjacent the piston head 432. A ball check valve 442 is disposed in the passage means 440 for preventing reverse flow of fluid under certain operating conditions.

The teeth of the sector 388 carried by the pawl plates 384 are enmeshed with the teeth of the rack section 434. The pawls 444 are pivotally supported on pins 445 carried by the plates 384. Disposed adjacent one of the plates 384 is a loosely journaled or floating plate 447 of the same character as the plate 417, the plate 447 being fashioned with a slot 448, shown in broken lines in FIG. 11, a pin 449 carried by an adjacent portion of the housing 355 extending into the slot 448. The function of the pin and slot 448 and 449 is similar to the function of the pin 419 and slot 418 hereinbefore described.

During movement of the indexing ratchet wheel 378, shown in FIG. 10, the floating plate 447, shown in FIG. 8, is in a position disengaging the pawls 444 from the teeth of the ratchet wheel 380, shown in FIG. 11. After a cutter indexing operation is performed by the arrangement shown in FIG. 10 and the pawls 422 withdrawn from the teeth of the ratchet wheel 378, fluid pressure exerted on the piston head 433 moves the ratchet section 434 in a left-hand direction, as viewed in FIG. 11, to rotate the sector 388, pawl plate 384 and the ratchet wheel 380 in a counterclockwise direction.

This action rotates the cutter 132 in the opposite direction until the end of the flexible indexing finger 327 is engaged by the cutter tooth which is moved into grinding position. When the cutter tooth is engaged with the indexing finger or member 327, fluid pressure is maintained against the piston head 433 to maintain the cutter against rotational movement during the grinding of the cutter tooth.

Figure 24:
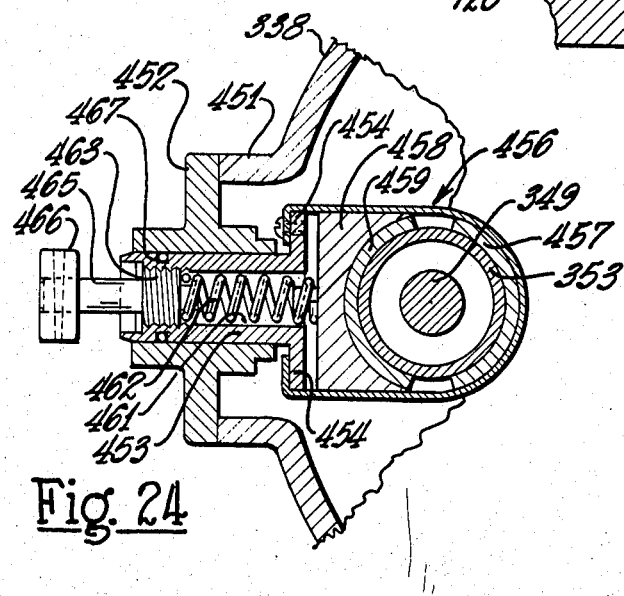
FIG. 24 is a detailed sectional view taken substantially on the line 24—24 of FIG. 1 illustrating a braking means for the cutter indexing means.

In indexing large heavy cutters the indexing mechanism is rather rapid in indexing the cutter and cutter mounting a distance of slightly more than one tooth. In indexing the work spindle supporting a heavy cutter, the momentum of movement may be sufficient to move the cutter more than the amount provided by the indexing step. Braking means is provided to exert a braking force on the shaft 349 so as to stop the cutter from overriding the index position. The brake mechanism is illustrated in FIGS. 5 and 24.

Formed on the rear of the housing 338 is a boss portion 451 to which is secured a fitting 452. The fitting 452, as shown in FIG. 24, is fashioned with a cylindrical bore in which is slidably mounted a sleeve-like member 453 having laterally extending projections or flanges 454.

Secured to the projections is a U-shaped band 456. Secured interiorly of the curved bight portion of the band 456 is a brake shoe 457. Slidably mounted within the leg portions of the U-shaped band 456 is a block 458. The curved region of the block 458 is equipped with a second brake shoe 459. The brake shoes engage the exterior cylindrical surface of the collar or drum 353 secured on the indexing shaft 349 shown in FIG. 5.

The slidable fitting 453 is fashioned with a central bore 461 accommodating an expansive coil spring 462, one end of the spring engaging a surface of the slidable block 458. An interior region of the bore 461 is threaded to accommodate a threaded member 463, the other end of the spring 462 abutting against the threaded member or abutment 463. The abutment 463 is fashioned with a tenon portion 465 equipped with a manipulating knob 466.

An oil ring or sealing ring 467 encircles the cylindrical portion of member 453 to prevent leakage of oil from the interior of the housing 338, as shown in FIG. 24. The amount of friction retarding or delaying movement of the indexing shaft 349 by the brake shoes 457 and 459 may be regulated and controlled through adjustment of the biasing pressure of the coil spring 462 by manipulating of the knob 466 to vary the position of the abutment 463.

FIGS. 1, 12 and 13 illustrate a counting means, adjustable to the number of teeth in a cutter to be ground, which controls the feed of the cutter support upwardly or toward the grinding wheel when a grinding cycle has been completed on all of the teeth of the cutter. A plate or member 469 is secured to the frame 10 of the grinding machine by screws 470, shown in FIG. 12, the plate providing mounting means for the ram stroke and cutter tooth counting unit 472 and journal means for the hand wheel 30, the latter being the means for adjusting the position of the carriage 12 longitudinally of the base frame 10.

The counting unit 472 includes a housing construction 474 which is secured to the mounting plate 469 by suitable means (not shown). The housing 474 is inclusive of a cylindrical portion 476 and a second cylindrical portion 477 disposed substantially at a right angle with respect to the axis of the cylindrical portion 476. The cylindrical portion 477 is fashioned with a bore or chamber 478 in which is disposed a plunger 479 slidable in the bore 478. The plunger 479 is fashioned with rack teeth 480.

The housing portion 476 is fashioned with a bore in which is press fitted a sleeve 482. Disposed within the sleeve 482 is a member or shaft 483 which is rotatable in the sleeve. Rotatably journaled on member 483 is a gear 484, the teeth of which are enmeshed with the rack teeth 480 on the plunger 479. As shown in FIG. 12, the member 483 is fashioned with two parallel planar surfaces 485 providing recesses or spaces 486 adjacent the gear 484. Disposed in each of the recesses 486 is a clutch roller 487.

The portion of member 483 having the planar surfaces 485 is fashioned with bores accommodating slidable plungers 488, expansive coil springs 489 engage the plungers 488 whereby the plungers engaging the rollers 487 urge the rollers into engagement with the interior surface 490 of the gear 484 and the planar surfaces 485 on member 483. The angularity of the bores accommodating the plungers 488 is such that the rollers wedgingly engage the surface 490 on the gear and the surfaces 485 on member 483 providing a one-way clutch means or clutch unit whereby the member 483 is rotated in one direction only by reciprocable movement of the plunger 479 in one direction.

The biasing forces of the springs 489 acting on the rollers 487 are in directions to cause the member 483 to be moved with the gear 484 when the gear is moved in a clockwise direction as viewed in FIG. 12.

A cap member 491 is secured to member 476 by screws (not shown). The member 483 is provided with a central bore accommodating an expansive coil spring 492 which engages a hardened metal ball 493. The cap member 491 is bored to accommodate a tenon portion 496 of a member 497 secured to the cap member 491 by screws 498. The ball 493 engages the end of the tenon 496, the spring biasing the member 483 in a direction toward the mounting plate 469.

Disposed adjacent to the one-way clutch arrangement hereinbefore described is a second one-way clutch of the same construction, the second one-way clutch comprising spring biased clutch rollers 500, shown in broken lines in FIG. 13, disposed in recesses of the same character as the recesses 486 but at right angles to the recesses 486, the second set of rollers 500 being biased in the opposite direction and adapted for engagement with the interior surface of the stationary sleeve 482. With the clutch rollers 500 biased in the opposite direction, movemenet of the plunger 479 in the opposite direction does not effect rotation of the shaft 483 because the rollers 500 lock the shaft against such rotation.

The member 474 is fashioned with four chambers 502, 503, 504 and 505 which are equally spaced circumferentially of the stationary sleeve 482. The sleeve 482 is fashioned with a first group of three ports 507, 507', 507" and a second group of three ports 508, 508' and 508".

The shaft 483 is provided with a first diagonally disposed slot or channel 510 for cooperation with the first group of ports 507, 507', 507", and a second diagonally disposed slot or channel 512 for cooperation with the second group of ports 508, 508' and 508".

One set of chambers 502, 504 receive oil under pressure from tubes 514 and 515. Chamber 503 is connected with an outlet pipe 517, the pipe 517 connected with an arrangement illustrated in FIGS. 14 and 15 for automatically elevating the cutter or workpiece after a predetermined amount of metal has been ground off from all of the teeth of the cutter. The other chamber 505 is connected by a pipe 518 with the arrangement shown in FIG. 15.

The cylindrical portion 477 of the counting unit 472 is provided with oil flow passages 519 and 520 which admit oil under pressure alternately into opposite ends of the cylinder containing the plunger 479. The passages 519 and 520 are connected by tubes (not shown) with the valve mechanism actuated by the lever 61, the valve mechanism being actuated by engagement of the abutment blocks 68 and 69 with the lever 61, shown in FIG. 1.

When a grinding cycle has been completed on all of the teeth of the cutter, the reciprocations of the plunger 479 and the movements of the member 483 through the one-way clutch provided by rollers 487, effect registration of port 507 with the slot 510 and the latter with port 507' in sleeve 482 to establish flow of oil under pressure to actuate plunger 580, shown in FIG. 15, to elevate the cutter through an increment as determined by the adjustment of an abutment 600, shown in FIG. 15. This arrangement and its operation is hereinafter more fully described.

As shown in FIG. 12, a member 524 has a tenon portion 525 pressed into the end of the cylinder bore 478. The member 524 is fashioned with a threaded portion 527, the teeth being preferably of a square cross section. Surrounding the member 524 is a sleeve or means 528 internally threaded as at 529 with threads of square cross section which accommodate the threaded portion 527. Through the use of threads of square cross section there is no lengthwise lost motion between the sleeve 528 and the member 524.

Mounted in a recess in the end of a sleeve 528 is a cap member or closure 531. The cap member has a central bore in which is press fitted a rod 532. The cap member 531 and the rod 532 are secured in assembled relation by a pin 533. The member 524 is fashioned with a bore slidably accommodating the rod 532. Secured on the end of the rod 532 is an abutment or stop member 535 extending into the bore 478. The end region 536 of the sleeve 528 is tapered, as shown in FIGS. 1 and 12, the tapered region being provided with a series of graduations (not shown) each representative of a tooth of a cutter to be ground.

The adjacent portion of the member 524 is provided with an index line 538, shown in FIG. 1, for cooperation with the graduations on the sleeve 528. A locking screw 540 is threaded into a bore in the sleeve 528 and is engageable with the threaded portion 527 to lock the sleeve 528 in an adjusted position. In adjusting the unit 472, the sleeve 528 is rotated to bring the graduation indicating the number of teeth in the cutter in registry with the index line 538 and locking screw 540 manipulated to lock the sleeve in such position. The adjustment of the sleeve 528 varies the position of the abutment or stop 535 in the cylinder bore 478. The sleeve 528 may be adjusted to effect grinding teeth of a cutter having any number of teeth not exceeding the number of graduations on the sleeve.

FIGS. 14 and 15 illustrate the arrangement or apparatus for actuating the cutter support means to successively and automatically elevate the cutter and cutter supporting means after each grinding cycle until a desired total amount of metal is removed from the cutter teeth. As previously described, the shaft 232 is rotatable to effect lowering or raising of the pedestal 200 which carries the cutter support means.

For initially positioning a cutter, the hand wheel 236 may be rotated to perform this function. The arrangement shown in FIGS. 14 and 15 includes a hand wheel 236 having a cylindrical hub portion 545 which fits in a bore in a member 546, the member being slotted so that the member may be drawn into locking engagement with the hub 545.

A manipulating stub shaft or locking means 549 is threaded into a threaded bore in a portion at one side of the slot and through an unthreaded bore in the other portion adjacent the slot in a conventional manner, the stub shaft 549 being fashioned with a collar 550, shown in FIG. 1, which engages the exterior of the member 546 when the stub shaft 549 is rotated in one direction to lock the member 546 to the hub 545. The member 546 is secured to a cylindrical member 551 fashioned with a flange 552. The member 551 is secured by a pin 553 to member 546 so as to be movable therewith. The shaft 232 is fashioned with an enlarged intermediate portion 555. Surrounding the shaft 555 is a cylindrical housing section 556 and an adjacent housing section 557.

A third housing section 559 embraces a reduced portion of the shaft 232 as shown in FIG. 14. The pinion 234 is secured on the end of the shaft. Journally supported upon the portion 555 of the shaft 232 is an elongated sleeve or bushing 562.

Mounted on the sleeve is a ratchet member 563 secured to the sleeve by a key 564. Secured to member 551 is a feed dial cap 565, the cap and the adjacent region of member 551 having aligned bores to receive a ratchet engaging latch member or plunger 566 and a coil spring 567 which biases the latch 566 into engagement with the teeth of the ratchet wheel 563.

A tenon portion 569 of the ratchet engaging member 566 extends through aligned bores in a finger or bar 570 and a knob 571, the tenon 569 being secured to the knob by a pin 572. Screws 573 secure the bar 570 to the knob 571. A second ratchet member 575 is secured on the sleeve 562 by a key 576. As shown in FIG. 15, the housing member 557 is fashioned with a cylindrical portion 578 having a cylindrical bore 579 in which is reciprocably disposed a plunger or member 580 which is reciprocated by fluid pressure.

Secured to one end of the cylindrical portion 578 is a member 581, a member 582 being secured to the opposite end of the cylindrical portion. The plunger 580 is fashioned with a space or recess 584. Disposed at the sides of the ratchet wheel 575 are generally circular plates 586 which are journaled for rotation on circular hub portions 587 provided on each side of the ratchet member 575. The plates 586 are of substantially identical shape and each is fashioned with a radially extending portion or projection 588, as shown in FIG. 15.

The projecting portions 588 are fashioned with aligned openings to snugly receive pivot pins 589 and 590. Mounted on pin 589 is a pawl 591 and mounted on pin 590 is a pawl 592. A coil spring 593 is disposed between the pawls, as shown in FIG. 15, to bias both pawls into engagement with the teeth of the ratchet wheel 575. The recess 584 in the plunger 580 is defined by surfaces 594 and 595 which are engaged alternately with the projections 588 upon reciprocatory movements of the plunger 580.

The member 581 is fashioned with a tenon portion 596 which is bored to slidably accommodate a stem or tenon 598 provided with an enlarged threaded portion 599, the latter being formed with a pad portion or abutment 600 which engages a surface of a recess in one end of the plunger 580. A threaded bushing 601 is pressed into a recess in the member 581 and has threaded engagement with the threaded portion 599, the bushing 601 having lengthwise arranged passages accommodating flow of fluid to the right-hand end of the plunger 580. A cup-shaped manipulating member 602 is telescoped over the tenon 596 and is secured to the stem 598 by a pin 603.

The member 602 is fashioned with a tapered region 604 provided with graduations indicating thousandths of an inch of vertical movement of the cutter supporting pedestal 200. The adjacent region of the tenon 596 is provided with an index line for cooperation with graduations on the member 602.

The abutment 600 is adjusted lengthwise of the cylinder 579 by rotation of the member 602. The relative position of member 602 determines the thickness or amount of metal to be removed from each cutter tooth during one grinding cycle of reciprocations of the grinding wheel.

For example, if it is desired to remove two thousandths of an inch of metal from each cutter tooth during a grinding cycle, the member 602 is adjusted to bring the proper graduation on the region 604 into registration with the index line on the tenon 596. This adjustment limits the lengthwise movement of the plunger 580 in a right-hand direction, as viewed in FIG. 15. The space between adjacent graduations on the region 604 is much greater than one thousandth of an inch because of the motion multiplication provided by the ratchet wheel 575 and the pinion 234 which rotates the drive gear 228 and shaft 220, shown in FIG. 7, for elevating the cutter support.

The tenon portion 596 of member 581 is provided with a bore 605 accommodating a slidable member or plunger 606 which is biased into engagement with an inner surface of the member 602 by a coil spring 607. The member 606, engaging member 602, provides a friction means for retaining the knob 602 in adjusted position.

The cylindrical portion 578 of membr 557 is fashioned with a fluid channel 609 in communication with the fluid conveying tube 518 and with a transverse channel 610 in the cover member 582 for transmitting fluid pressure into the left end of the cylinder 579 as viewed in FIG. 15 to move the plunger 580 toward the abutment 600 thereby causing the pawl 591 or pawl 592 to effect slight rotation of the ratchet wheel 575 to elevate the cutter supporting pedestal 200 an amount in thousandths of an inch equal to the setting or adjustment of member 602.

The registration of the fluid ports of the counting mechanism, shown in FIGS. 12 and 13, is effective when a grinding stroke has been completed on all of the teeth of a cutter, to provide for the transmission of fluid under pressure through the tube 518 to actuate the plunger in a right-hand direction.

A fluid conveying tube is connected with valve means (not shown) for delivering fluid under pressure to the right-hand end of the cylinder 579 to return the plunger 580 to a position preparatory to the next succeeding operative movement of the plunger to elevate the cutter. During movement of the plunger 580 in a left-hand direction the pawls 591 and 592 override the teeth of the ratchet wheel 575 so as not to impart movement to the ratchet wheel.

Valve means is provided for continuing reciprocation of the ram 34 to effect the finish grind cycle or cycles performed on all of the teeth of the cutter. This valve mechanism is contained in a housing 618 provided with a cover 619 shown in FIGS. 14 and 16. The housing 618 is provided with a bore 620 accommodating a tubular extension 621 formed on the cap 619. The chamber 620 in housing 618 is in communication with the channel 610 in plate 582 by a tube 622, shown in FIGS. 15 and 16.

The housing 618 is fashioned with a bore slidably accommodating a stem 623 having a valve portion 624, the valve portion normally engaging an annular valve seat 625 under the influence of an enpansive coil spring 626. The members 571 and 565, including the finger 570 shown in FIG. 14A, are movable with members 546 and 551 shown in FIG. 14. After the last rough grinding cycle is performed on the cutter teeth, the movable finger 570 engages the stem 623.

The plunger or stem 623, when actuated, moves the valve portion 624 from its seat to open position allowing oil under pressure from the space 610 to move through the tube 622 past the valve 624 and through the tube 517 into the cylinder 629 of a cut-off switch unit 630 shown in FIGS. 17 and 18.

The arrangement shown in FIGS. 17 and 18 includes a circuit interrupting switch contained in a housing 632, the switch being intercalated in the circuit of the motors 86 and 174. The housing 632 containing the circuit interrupting switch is mounted upon a frame plate 634. The switch construction includes a spring-biased contact-actuating plunger 635. The cylinder 629 is fashioned in a member 636. Slidably disposed in the cylinder 629 is a piston 638 secured to a rod 639 extending through a passage formed in a head region of the member 636.

A yoke or bracket 640 supports a ratchet wheel 641 and a star wheel 642. A pawl 644 has a tooth in engagement with the ratchet wheel 641, the pawl being normally biased into engagement with the ratchet wheel by a spring 645. The piston is normally biased in a left-hand direction, as viewed in FIG. 17, by an expansive coil spring 647.

The yoke 640 is bored as at 649 to accommodate a coil spring 650, the passage 649 accommodating a pawl tooth 651 preventing rotation of the ratchet wheel and the star wheel when the piston 638 is moved in a right-hand direction until one of the points of the star wheel 642 engages and actuates the plunger 635 of the circuit interrupting switch 632 to stop the operation of the grinding machine after the two automatic finishing or "sparking out" revolutions which the cutter makes after the rough grinding cycles have been effected on all of the teeth of the cutter. A vent opening 643 is connected by a tube (not shown) to the oil reservoir to return oil to the reservoir which may seep past the piston 638.

As shown in FIG. 14A the member 565 is provided with a pivot pin 653 on which is pivotally supported a handle 655 having a pad portion 656 adjacent the finger or bar 570. By manipulating the handle 655 in a clockwise direction, the bar or finger 570 may be elevated to disengage the ratchet member 566 from the ratchet wheel 563, shown in FIG. 14, for readjusting members 546 and 551 relative to the stationary housing 556.

The arrangement shown in FIG. 14A is for the following purpose: The operator, preparatory to a cutter grinding operation, estimates the total thickness or amount of metal to be removed from the cutter teeth and adjusts the dial on member 552 to the estimate. If, during the grinding of the cutter teeth, it is found that the estimate of the thickness of metal to be removed from the teeth is more or less than the amount that must be removed to properly bring all the teeth to the same dimension, the operator loosens the locking knob 549, shown in FIGS. 1 and 14, disengages the ratchet 566 from the ratchet wheel 563 by manipulating the handle 655 to lift the bar 570 and the ratchet member 566, and readjusts the members 546 and 551 with respect to the housing 556.

After these operations have been performed, the operator again tightens the locking knob 549 and the grinding operations continue to remove the amount of stock from the cutter teeth for which the members 546 and 552 have been readjusted.

Means is provided for adjustably metering the flow of oil under pressure to actuate the plunger 432, shown in FIG. 11, upon index return movement of the mechanism to reduce the impact of a cutter tooth against the indexing finger 327, shown in FIG. 4, to prevent damage or breakage of the cutter tooth. As shown in FIG. 4, there is secured to the housing construction 355 an auxiliary housing 660, shown in FIGS. 19 and 20.

The housing 660 is fashioned with bores 661 and 662 and counterbores 663 and 664. Disposed in the counterbore 664 is a ball check valve 442, shown in FIGS. 11 and 19. A tubular member 667 biases the check ball 442 to close the bore or port 662 under the influence of an expansive coil spring 668. A channel 670 is in communication with the bores 661 and 662 and oil under pressure is supplied to the channel through a tube 672. The bore 664 is in communication with a passage 673 which is in communication with the cylinder 430 accommodating the plunger 429, shown in FIG. 11.

A channel 675 connects the counterbores 663 and 664. Aligned with the channel 675 is a bore 676 accommodating a valve body 677 having a valve portion 678. Fitted into a bore 680 is a sealing gland or member 681 and the tenon portion of a closure 683. The closure 683 has a bore accommodating a portion of the valve body 677, the valve body having a threaded portion 684 equipped with a manipulating knob 685. The valve portion 678 has a by-pass or passage 686 to permit minute oil flow even though the valve is adjusted to a closed position.

Figure 19:
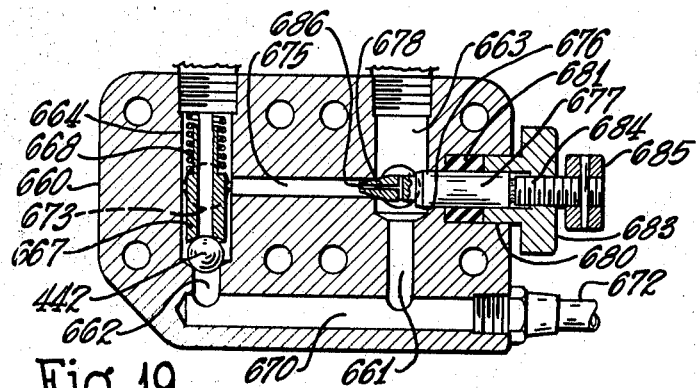
FIG. 19 is a detailed sectional view taken substantially on the line 19—19 of FIG. 4 showing the valve means for controlling the speed of index return mechanism illustrated in FIG. 11.
Figure 20:
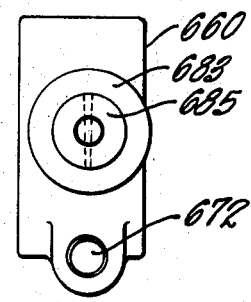
FIG. 20 is an end view of the construction shown in FIG. 19.

By rotating valve body 677, the tapered portion 678 may be adjusted relative to the end of channel 675 to regulate or restrict the flow of oil into the left-hand end of the cylinder containing the plunger 429 to provide for a slow return of the cutter and support arrangement to reduce the impact of the cutter tooth engaging the indexing finger 327, shown in FIG. 4. The arrangement shown in FIGS. 19 and 20 is associated with an indexing return four-way valve construction of the character disclosed in my Pat. 3,081,253.

Figure 21:
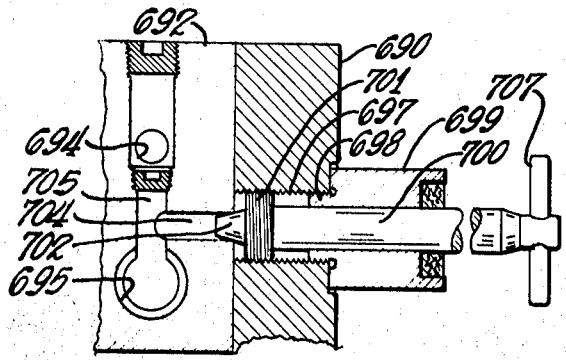
FIG. 21 is a detailed sectional view taken substantially on the line 21—21 of FIG. 1 illustrating a speed control valve for the ram return stroke.

FIG. 21 is a sectional view taken on FIG. 1 illustrating a speed control means for regulating the speed of the ram moving in a retracting direction. Secured within the housing portion 690 (shown in FIG. 1) is a block 692 having fluid passages 694 and 695 which form part of the fluid conveying system for reciprocating the piston 56 in the cylinder 55, shown in FIG. 3. The passage 695 accommodates a four-way spool type valve 720, shown in FIG. 23, of the character shown in my Pat. 3,081,253 for directing oil pressure alternately to the opposite ends of the piston 56 to effect reciprocation of the ram.

The housing portion 690 is provided with a threaded bore 697 to accommodate a threaded tenon 698 of a fitting 699. The fitting 699 is bored to accommodate a valve body 700 having a threaded portion 701 which cooperates with the threads of the threaded bore 697, the valve body 700 having a tapered valve portion 702 which extends into the entrance of an oil conveying channel 704 which is in communication with a second channel 705.

The valve body 700 is provided with a manipulating handle 707 for adjusting the valve portion 702 with respect to the passage 704. By adjusting the position of the valve 702 the oil may be metered out of the left-hand of the cylinder 55, shown in FIG. 3, to thereby regulate flow of oil past the valve 702 to control the speed of the return stroke of the ram.

Figure 23:
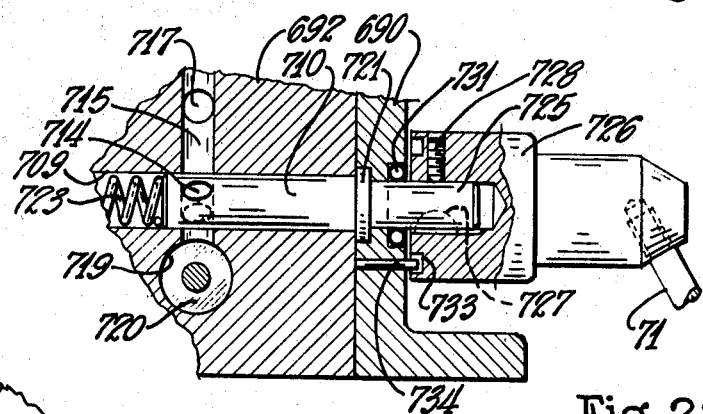
FIG. 23 is a detailed sectional view taken substantially on the line 23—23 of FIG. 1 illustrating the operating control means and forward speed control valve for the hydraulically actuated reciprocating ram carrying the grinding wheel.

FIG. 23 is a sectional view taken on FIG. 1 illustrating the master control for effecting actuation of the ram 34. The housing portion 692 is provided with a transverse bore 709 accommodating a cylindrical valve body 710 for rotational movement. Secured to portion 692 is a plate 690. The valve portion 710 is fashioned with a transverse passage 714 which is adapted for registration with a passage 715.

The passage 715 is in communication with a lengthwise arranged passage 717 and with a lengthwise arranged passage 719 in which is slidably disposed the spool valve 720.

The valve body 710 has a flange or shoulder 721 disposed in a recess in the plate member 690 to prevent endwise movement of the valve. A coil spring 723 exerts pressure upon the right-hand end of the valve 710 in order to establish friction to maintain the valve in adjusted position.

The valve 710 is fashioned with a tenon 725 on which is snugly fitted a sleeve 726 secured on the tenon by a key 727 and a lock screw 728. The sleeve 726 is fashioned with a manipulating handle 71 for rotating the valve 710. A fluid seal 731 prevents seepage of oil along the tenon 725. The sleeve 726 is fashioned with a circular recess 733 which accommodates a projecting portion of a pin 734 pressed into a bore in the plate 690.

An abutment (not shown) is disposed in the recess 733 and positioned whereby engagement of the pin 734 with the abutment determines a closed position of the valve 710, this position blocking the passage 715 so that no oil under pressure is delivered past the spool valve 720 into the cylinder 55 and the ram thus maintained in a static position. By manipulating the handle 71, the valve 710 may be rotated to bring the passage 714 in the valve in registration with the passage 715 whereby oil under pressure is admitted alternately into the ends of the cylinder 55 to reciprocate the ram, the extent of opening of the valve regulating the speed of the ram.

The manual controls for the electric motors 86 and 174 are contained in a switch box 736, shown in FIG. 1. A control button 737 actuates a switch to rotate the grinding wheel drive motor 86 in one direction. The control button 738 reverses the direction of rotation of the grinding wheel drive motor 86. The control button 739 actuates a switch to energize the pump driving motor 174 for developing oil pressure in the hydraulic system. The control button 740 is an emergency switch for de-energizing both motors 86 and 174. A signal lamp 741 is provided for indicating the completion of grinding operations on a cutter.

Figure 30:
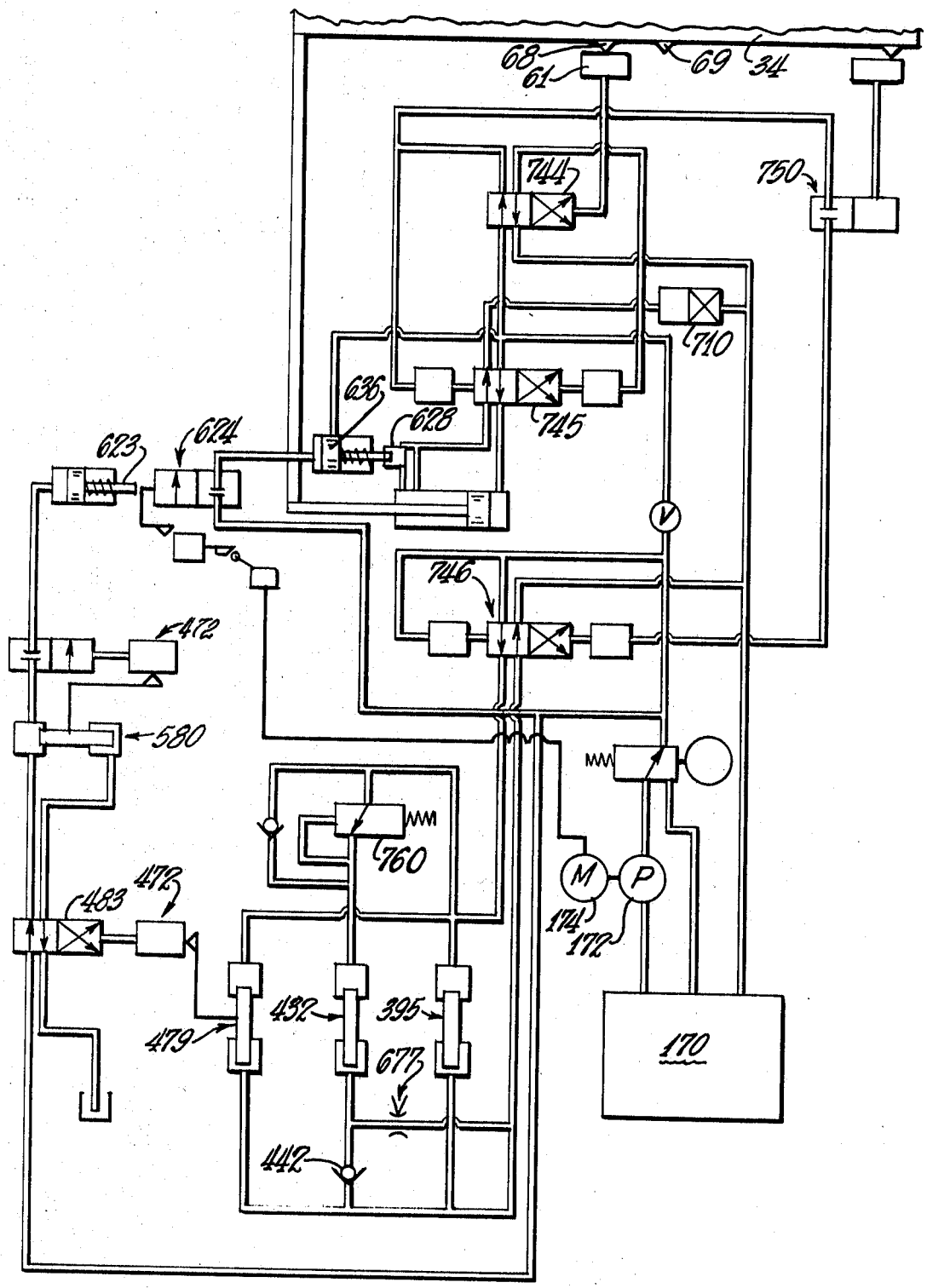
FIG. 30 is a schematic drawing of the hydraulic system for actuating and controlling various mechanisms of the apparatus.

The hydraulic system for actuating the various components is illustrated schematically in FIG. 30, the system being similar to the hydraulic system disclosed in my Pat. 3,081,253. The hydraulic system will be explained in the following description of operation of the apparatus. The cutter 312, the teeth of which are to be ground or resharpened, is mounted upon the holder 300 and securely fastened by means of a bolt 314 shown in FIG. 4. In some forms of the cutters there may be a series of spaced openings to accommodate several bolts and in such cutters a bolt may be inserted through each opening into correspondingly spaced threaded openings in the holder 300.

Where the cutter diameter is of substantial size, the flexible indexing finger or lip rest 327 is properly adjusted to engage the teeth of the cutter in the manner shown in FIG. 4. The mounting means for the cutter must be adjusted to a proper position wherein the grinding wheel will engage the teeth of the cutter to grind the same. In accomplishing this function, the spindle 384 carrying the cutter support or holder 300 may be rotated about the axis of the trunnions 270 and 272 to a desired angular position if the teeth to be ground are of an angular character.

This adjustment is accomplished by loosening the bolts 276, shown in FIG. 5, to release the bearing caps 273 and 274 so that the spindle 284 may be rotated about the trunnion axis. The extent of angular positioning of the cutter about the axis of the trunnions is determined by the graduations on the annular member 339 in registration with the pointed index member 342, shown in FIG. 5. After the spindle 284 is moved to the desired angular position, the trunnion bearing caps 273 and 274 are then tightened in position by drawing up nuts on the cap securing bolts 276, shown in FIG. 5.

By adjusting the components 300, 324 and 325 comprising the indexing finger support means, shown in FIG. 4, the finger 327 may be properly positioned with respect to the teeth of the cutter in any angular position of the spindle 284.

If the teeth to be ground are askew with respect to the axis of the cutter, the trunnion support 249 may be adjused about its axis to the proper angularity. With reference to FIG. 4 this may be accomplished by releasing the nuts 261 and rotating plate 245 and member 249 which includes the portion 250 until the desired angle indicated by one of the graduations 262 is in registration with the index member 264. When this adjustment has been made, the nuts 261 are drawn up on the bolts 259 to secure the trunnion support member 249 in fixed relation to the pedestal 200.

The operator then adjusts the abutments 68 and 69 (see FIG. 1) along the reciprocable shaft or bar 65 to determine the length of reciprocating strokes of the ram 34. The abutments 68 and 69 alternately engage the lever or arm 61 actuating valve means for controlling the spool valve means to direct fluid pressure alternately into opposite ends of the cylinder 55 shown in FIG. 3.

The operator then rotates the hand wheel 236 to elevate the pedestal 200 and the cutter 312 to a desired position to effect grinding of teeth on the cutter. With reference to FIG. 2, the crank 194 may be rotated, rotating the screw 191 to adjust the pedestal 200 and the cutter supporting means transversely of the frame to move the cutter to proper position in front of the grinding wheel.

The operator then rotates the sleeve 528 of the tooth counter 472, shown in FIGS. 1, 12 and 13, to a position corresponding to the number of teeth on the cutter, and draws up the locking screw 540 to maintain the adjustment of the sleeve 528. This action positions the abutment 535, shown in FIG. 12, for predetermining the length of stroke of the plunger 479. The operator releases the locking member 549, shown in FIGS. 1 and 14, and adjusts the members 546 and 551 to a position, indicated by graduations on the peripheral face of the flange 552, determining the total amount of metal in thousandths of an inch to be removed from the teeth of the cutter.

The operator then adjusts the knob or sleeve 602, shown in FIG. 15, which positions the abutment 600 with respect to the plunger 580. This adjustment provides for the removal of a predetermined small thickness of metal from the teeth during each grinding cycle or one revolution of the cutter. For example, assuming the adjustment of members 546 and 551 is set to remove twenty thousandths of an inch total from each tooth of the cutter, and the knob 602 adjusted to remove two thousandths of an inch of metal with each grinding cycle on all of the teeth, the total number of complete rough grinding cycles would be ten and an additional two finishing or "sparking out" grinding cycles on all of the teeth before the machine is automatically de-activated.

The means for feeding the grinding wheel downwardly after each grinding stroke in order to dress the wheel is adjusted to proper position. The operator initially adjusts the vertical position of the grinding head so that it will engage the wheel dressing diamond by manually rotating the shaft 96. The clamp 104, shown in FIG. 3 is then drawn up to prevent further rotation of the shaft. The operator then rotates the sleeve 126, shown in FIG. 25, to a position determining the amount that the grinding head is fed downwardly with each reciprocation of the ram for dressing the wheel.

During grinding operations, the pad 110, shown in FIGS. 1 and 25, is engaged by the abutment 120 at each rearward stroke of the ram to move the abutment 120 and the rack bar 115 a slight amount. Through the overrunning clutch shown in broken lines in FIG. 25, the member 118 and the worm 100 are rotated a slight amount at each reciprocation of the ram to move the grinding wheel downwardly an amount effective to dress the wheel.

This downward movement of the grinding wheel should be a minimum, just sufficient to dress the grinding wheel. It is found that the amount of downfeed of the grinding wheel for each grinding stroke is usually between .0001 of an inch and .0003 of an inch for most grinding wheel dressing operations.

The operator depresses the switch buttons 737 and 739 to energize the motors 86 and 174, the motor 86 rotating the grinding wheel and the motor 174 driving the pump 172 to develop hydraulic pressure in the system. The operator then moves the master control handle 71 to start the machine in operation, the handle 71 rotating the valve 710, shown in FIG. 23, into a position wherein oil is metered out of the cylinder 55 which causes movement of the piston 56 under oil pressure at the opposite side of the piston, the metered oil being vented through the port 714 of the valve 710 and returned to the reservoir 170.

The flow of oil under pressure to effect reciprocation of the oil into and away from the cylinder 55 is controlled by a fluid actuated four-way valve 744, shown schematically in FIG. 30. The adjustable abutments 68 and 69 are alternately engaged by the arm 61, the arm mechanically actuating the valve 744 which, in turn, provides for hydraulically actuating valve 745 to effect reciprocating movements of the piston 66.

A valve 750, shown in FIG. 30, is mechanically actuated by movement of the piston 56, the valve 750 controlling flow of oil under pressure to the indexing valve 746, the indexing valve controlling flow of oil to the cylinders containing the plungers 387 and 429, shown in FIGS. 10 and 11, to effect rotation of the cutter a distance to bring the next tooth to be ground past the flexible indexing finger 327, shown in FIG. 4.

The valve 745 reverses reciprocation of the ram 34 by reversing the movement of the piston 56 through the valve arrangement 744 at the same time the four-way valve 746 is actuated by oil pressure at each reciprocation of the ram 34 to actuate the indexing mechanism. Each actuation of the indexing valve 746 reciprocates piston 479, the reciprocations actuating the teeth counting mechanism 472 shown in FIG. 12.

At each reciprocation of the ram 34 the counting mechanism shown in FIG. 12 through hydraulic pressure moves the plunger 479 of the counting mechanism, shown in FIGS. 8 through 11, and moves the plunger 395 to rotate the cutter 312 through a distance slightly greater than one tooth. The plunger 482 is moved in the opposite direction under hydraulic pressure to rotate the cutter in the opposite direction until the adjacent tooth of the cutter engages the index finger 327 thus positioning the cutter for the grinding of a tooth.

The mechanical counter 472 actuates the member 483, shown in FIG. 13, which actuates the piston or plunger 580 shown in FIG. 15. The valve member or shaft 483 of the counter mechanism is moved through successive rotative increments under the influence of the one-way clutch means, shown in FIGS. 12 and 13, until ports in the valve member 483 and the ports in the sleeve 482 are in proper registration to actuate the cutter elevating mechanism, shown in FIG. 14, to elevate the cutter 312 whereby the succeeding strokes of the grinding wheel engage the elevated cutter to remove a small increment of metal from each tooth.

In reference to FIGS. 12 and 13 illustrating the counting mechanism for initiating movement of the cutter elevating mechanism, the sleeve 528 is adjusted for the number of teeth in the cutter, for example, for a twenty-four tooth cutter, the sleeve 528 will be adjusted for grinding twenty-four teeth at each revolution of the cutter. The adjustment of the sleeve 528 positions the abutment 535 for determining the length of stroke of the plunger 479. At the completion of a grinding stroke on each tooth, the plunger 479 moves away from engagement with the abutment 535 to the position shown in FIG. 12 and carries with it the floating gear 484 which moves the hub portion 483 a slight amount. On the opposite stroke of the piston the other overrunning clutch permits retraction of the plunger without any movement of the hub portion 483. The other overrunning clutch prevents the hub from moving on retraction stroke of the plunger 479.

In order that the subsequent cycle of grinding of all of the teeth is not initiated on the same tooth on each elevation of the cutter, the movement of the floating gear 484 is proportioned or reduced so that, for example, if teeth of a twenty-four toothed cutter are being ground, the gear 484 moves through a distance equivalent to twenty-six reciprocating strokes of the grinding wheel. When this number of movements or reciprocations of the plunger 479 has ensued, the port 507 is in registration with a channel 510 and port 507'.

In this position it permits oil under pressure to be delivered to the cavity 579 at the left end of the plunger 580 shown in FIG. 15. This oil pressure moves the ratchet wheel 575 which, as shown in FIG. 14, partially rotates ratchet 575 which, in turn, rotates sleeve 562 and ratchet wheel 563.

The oil in the cavtiy at the right end of the piston 580 in FIG. 15 is forced through tube 515 and (see FIG. 13) moves through port 508, channel 512 and port 508' for return to the oil reservoir. Upon further rotation of the hub 483, the port 508" registers with the slot 512 to convey oil through port 508 and tube 515 to the cavity 612 at the right-hand end of the piston 580 (FIG. 15) to force the piston 580 in a lefthand direction preparatory to a subsequent elevating movement of the cutter supporting mechanism.

If a pawl tooth on the extremity of plunger 569 is in engagement with the teeth of the ratchet wheel 563, the member 565 is rotated and, as it is clamped through the clamping screw 549 to the shaft portion 555, shaft portion 555, shaft 232 and the gear 234 carried thereby are rotated. The gear 234 rotates the gear 228 on the shaft 219 (see FIG. 7) elevating the pedestal 200 and the cutter carried by the cutter supporting means on the pedestal, the cutter being elevated an amount determined by the setting of the abutment 600 (shown in FIG. 15) by rotation of the knob 602 which determines the movement of the plunger 580 and thereby regulates the distance that the cutter is elevated preparatory to the next grinding cycle.

The reciprocations or strokes of the ram and grinding wheel are continued until all of the teeth have been engaged by the grinding wheel at which time the counter mechanism 472, shown schematically in FIG. 30, is actuated. The counter mechanism again functions to effect movement of the cutter elevating plunger 580, shown in FIG. 15, preparatory to a successive rough grinding of the cutter.

The elevation movements of the cutter cease when the bar 570, shown in FIG. 14, engages the plunger or stem 623 as engagement of the bar 570 with the plunger prevents further indexing movements of the ratchet wheel 575, shown in FIGS. 14 and 15, which controls the elevating increments of the cutter mounting means and cutter.

With reference to FIGS. 16 and 17, the valve stem 623 is normally maintained in the position shown in FIG. 16 throughout the entire grinding cycle. At the termination of the last rough grinding cycle, the hand wheel 236 has rotated to a position wherein the cam 570 engages the stem 623 elevating the valve 624, whereby oil under pressure from channel 610 (see FIG. 15) moves through the tube 622 and past the open valve 624 through pipe 517 to the left end of the switch mechanism (FIG. 17) and actuates the plunger 638.

On the first stroke of the plunger 638, no star point 642 is in alignment with the switch plunger 635. Reciprocation of the ram 34 and grinding wheel continues a finish grinding cycle for two complete revolutions of the cutter.

The continued rotation of the shaft 483 of the counting mechanism shown in FIG. 13 continues until oil pressure through ports 507, 507' and channel again admits oil pressure in cavity 579, shown in FIG. 15, to again open the valve 624 so that oil pressure actuates plunger 638, shown in FIG. 17. This action continues until after two revolutions of the cutter, and one of the star points 642 is aligned with the switch plunger to actuate the switch 637 to de-energize the motors and terminate grinding operations. The number of finish grind revolutions of the cutter may be varied by changing the number of star points 642 of the switch actuating mechanism.

Through this arrangement all of the teeth of the cutter are ground by successive increments until all of the teeth are of a uniform shape and are finish ground and ready for reuse.

When a small diameter cutter is to be ground, it is mounted on the spindle 284, shown in FIG. 4, in the same manner as hereinbefore described. As small cutters are not readily indexible through the use of the flexible indexing finger 327, the indexing means at the lower end of the cutter mounting assembly, shown in FIGS. 2 and 4, is utilized. In the use of this indexing means, an indexing plate 290 having the same number of teeth 292 as the number of teeth in the cutter to be ground is assembled on the tapered portion of the spindle 284 at the lower end of the spindle 284 and locked in position by the nut 291.

During indexing, in grinding small diameter cutters, the flexible indexing finger 295 on a rod 294 supported by one of the bosses 293, shown in FIG. 2, is successively engageable with the teeth in the indexing plate 290.

The fluid pump 172 is of a character to develop a pressure of about one hundred sixty pounds per square inch for normal grinding operations with cutters of a size where the indexing is performed by the indexing finger 327 shown in FIG. 4. When small diameter cutters are to be ground and the indexing plate 292 and the indexing finger 295 at the lower end of the spindle 284 are employed for indexing, it is desirable to reduce the oil pressure in actuating the index return plunger 432 so as not to fracture or damage the indexing finger 295.

A pressure reducing arrangement is provided for the purpose. Referring to FIGS. 1 and 30, a pressure reducing valve 760 is intercalated in the hydraulic system for reducing the fluid pressure to the index return piston 432 so as to move the plunger 432 slowly in order to reduce the pressure of the cutter on the indexing finger 295 when grinding small diameter cutters. The pressure reducing valve 760 is of the adjustable type having means 762 for regulating the fluid pressure acting upon the plunger 432.

It is apparent that, within the scope of the invention, modifications and different arrangements may be made other than as herein disclosed, and the present disclosure is illustrative merely, the invention comprehending all variations thereof.

I claim:

1. In a grinding apparatus, in combination, support means, a reciprocable ram, means mounting said ram for reciprocation, hydraulically actuated means for reciprocating said ram, a grinding head carried by the ram and arranged for movement relative thereto in directions normal to the longitudinal axis of the ram, a grinding wheel journally supported by the head, means for rotating the wheel, a pedestal mounted on said support means adjustable relative to the support means, a member mounted upon the pedestal rotatably adjustable about an axis, housing means mounted on said member for rotatable adjustment about an axis normal to the axis of rotatable adjustment of the member, a spindle rotatably supported on said housing means adapted to mount a workpiece upon which grinding operations are to be performed, and means for indexing the spindle to rotate the workpiece to move successive portions thereof in position to be engaged by the grinding wheel.

2. The combination according to claim 1 wherein the mounting means for the ram provides for straight line reciprocation of the ram.

3. The combination according to claim 1 wherein the pedestal is adjustable in vertical and transverse directions relative to the support means, means for locking the member in an adjusted position relative to the pedestal, and means for locking the housing means in an adjusted position relative to said member.

4. In a grinding apparatus, in combination, support means, a reciprocable ram, means carried by the support means mounting said ram for reciprocation, hydraulically actuated means for reciprocating said ram, a grinding head mounted by and reciprocable with the ram, a grinding wheel journally mounted on the grinding head, a motor for rotating the grinding wheel, a pedestal adjustably mounted by the support means, a saddle member mounted on the pedestal, a member having trunnions mounted in bearings provided on the saddle member for adjusting said member to various angular positions, a spindle journally supported on said member adapted to support a multitoothed cutter on which grinding operations are to be performed, and indexing means for rotating the spindle and cutter to bring successive teeth of the cutter in position to be engaged by the grinding wheel.

5. The combination according to claim 4 wherein the cutter indexing means includes a flexible finger arranged for successive engagement with teeth of the cutter, a first ratchet and pawl means for rotating the cutter a circumferential distance to move a tooth of the cutter past the flexible finger, a hydraulic actuator for the first ratchet means, second ratchet and pawl means for rotating the cutter in the opposite direction to engage the flexible finger with the adjacent cutter tooth to index the same, and a hydraulic actuator for actuating the second ratchet and pawl means.

6. The combination according to claim 4 including counting means adjustable to the number of teeth in a cutter to be ground, hydraulically actuated means controlled by the counting means for elevating the pedestal at the completion of a grinding operation on all of the cutter teeth, and adjustable means limiting the extent of movement of the pedestal elevating means for each cycle of grinding operations on all of the teeth.

7. The combination according to claim 6 including a second manually adjustable means associated with the hydraulically actuated means for elevating the pedestal for predetermining the total number of successive elevating movements of the pedestal, switch means for de-energizing the motor for rotating the grinding wheel, and hydraulically actuated plunger means for actuating said switch means upon completion of the cycles of grinding operations on the teeth of the cutter.

8. The combination according to claim 4 wherein a first housing means secured to the trunnion-supported member encloses the first and second pawl and ratchet means and hydraulic actuators therefor, a second housing means secured to said member, and transmission gearing enclosed in said second housing means for transmitting movement of the ratchet means to the cutter supporting spindle.

9. The combination according to claim 8 including adjustable braking means associated with the transmission gearing.

10. The combination according to claim 8 wherein the transmission gearing includes gears interchangeable in position to reverse the direction of rotation of the spindle to effect grinding operations on a left-hand cutter.

11. In a grinding apparatus, in combination, support means, a reciprocable ram, a grinding head supported by the ram, a grinding wheel rotatably supported on the grinding head, a motor for rotating the grinding wheel, means carried by the support means for mounting a workpiece to be processed by the grinding wheel, means mounting said ram for straight line reciprocation of the ram, said ram mounting means including bearing members disposed above the ram and engageable with first planar surfaces on the ram, a plurality of rolls disposed beneath the ram and engaging second planar surfaces provided on the ram, a pair of supplemental carriages journally mounting the rolls, threaded abutment means mounted by the support means beneath each supplemental carriage, each abutment being vertically adjustable to eliminate relative vertical movement of the ram to provide straight line reciprocation thereof, and means for locking each abutment means in adjusted position.

12. The combination according to claim 11 wherein each supplemental carriage journally supports two rolls, each abutment means being disposed to engage the adjacent supplemental carriage at a region intermediate the rolls carried thereby.

13. The combination according to claim 12 including a C-shaped clamp engaging each of the abutment means for locking the abutment means in adjusted position.

14. In a grinding apparatus for grinding the teeth of a face mill cutter including, in combination, a support base, a carriage supported by and adjustable relative to the base, a reciprocable ram, bearing means on said carriage mounting said ram for reciprocation in a straight line, a grinding head mounted by said ram, a spindle journaled on said head for rotation about an axis normal to the longitudinal axis of the ram, a motor supported by the ram for rotating the spindle, said spindle adapted to mount a grinding wheel, hydraulically actuated means for reciprocating said ram, said grinding head being angularly adjustable relative to the axis of the ram, means for locking the grinding head in angularly adjusted positions, a dressing tool mounted by the carriage for dressing the grinding wheel, means actuated by reciprocation of the ram for moving the grinding head to engage the grinding wheel with the dressing tool, a pedestal supported on said base and adjustable in vertical and transverse directions relative to the base, a first member supported on the pedestal for adjustment about a vertical axis, a second member having trunnions supported by the first member and being adjustable about the axis of the trunnions, a shaft journally supported by said second member, said shaft having a portion adapted to support a face mill cutter to be processed by the grinding wheel, and means for indexing the shaft to rotate the cutter to move successive teeth thereof in position to be engaged by the grinding wheel.

References Cited

UNITED STATES PATENTS

| | | | |
|---|---|---|---|
| 3,081,253 | 3/1963 | Garrison | 51—100X |
| 3,146,551 | 9/1964 | Carlsen et al. | 51—34 |
| 3,393,475 | 7/1968 | Smith et al. | 51—124 |
| 3,395,491 | 8/1968 | Burger et al. | 51—34 |

OTHELL M. SIMPSON, Primary Examiner

U.S. Cl. X.R.

51—105, 125.5